(12) United States Patent
Yagi et al.

(10) Patent No.: US 7,749,625 B2
(45) Date of Patent: Jul. 6, 2010

(54) FUEL FOR FUEL CELL, FUEL CELL AND APPLICATION THEREOF

(75) Inventors: Minoru Yagi, Tokyo (JP); Tetsuyuki Nishi, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 1083 days.

(21) Appl. No.: 11/436,653

(22) Filed: May 19, 2006

(65) Prior Publication Data

US 2008/0233438 A1    Sep. 25, 2008

Related U.S. Application Data

(63) Continuation of application No. PCT/JP2004/018021, filed on Dec. 3, 2004.

(30) Foreign Application Priority Data

| Dec. 18, 2003 | (JP) | ............................. 2003-421077 |
| May 14, 2004 | (JP) | ............................. 2004-145202 |
| Jun. 18, 2004 | (JP) | ............................. 2004-181319 |
| Jul. 14, 2004 | (JP) | ............................. 2004-207458 |
| Jul. 23, 2004 | (JP) | ............................. 2004-216011 |

(51) Int. Cl.
*H01M 8/04* (2006.01)
*C10L 7/00* (2006.01)

(52) U.S. Cl. ........................................ 429/17; 429/266

(58) Field of Classification Search ................... 429/13, 429/17; 44/266
See application file for complete search history.

(56) References Cited

U.S. PATENT DOCUMENTS 4,493,878 A    1/1985    Horiba et al.

FOREIGN PATENT DOCUMENTS

| EP | 0 092 802 A2 | 11/1983 |
| JP | 58-186170 | 10/1983 |
| JP | 58-186170 A | 10/1983 |
| JP | 02-234358 | 9/1990 |
| JP | 04-14765 | 1/1992 |

(Continued)

*Primary Examiner*—Patrick Ryan
*Assistant Examiner*—Thomas H. Parsons
(74) *Attorney, Agent, or Firm*—Manabu Kanesaka

(57) ABSTRACT

A fuel cell fuel contains an organic fuel used as a fuel for a fuel cell. The organic fuel is in a form of a solid molecular compound, such as an inclusion compound. The molecular compound can be prepared by contact catalytic reaction of a compound for forming the molecular compound and the organic fuel, and allows a liquid organic fuel to be in a solid compound to store the organic fuel stably in a relatively lightweight form. The molecular compound easily releases the organic fuel by, for example, heating, and the organic fuel is supplied to the fuel electrode of a fuel cell. Thus, the handleability of the fuel cell fuel containing the organic fuel can be improved, and the problems of corrosion, freezing of the fuel, crossover, and so forth can be solved.

47 Claims, 6 Drawing Sheets

FOREIGN PATENT DOCUMENTS

| | | |
|---|---|---|
| JP | 04-13828 | 3/1992 |
| JP | 10-299994 * | 11/1998 |
| JP | 11-26005 | 1/1999 |
| JP | 2001-93541 | 4/2001 |
| JP | 2001-185184 * | 7/2001 |
| JP | 2001-185184 A | 7/2001 |
| JP | 2002-83612 | 3/2002 |
| JP | 2003-217634 | 7/2003 |
| JP | 2003-217642 | 7/2003 |
| JP | 2003-323896 | 11/2003 |
| JP | 2004-39293 | 2/2004 |
| JP | 2004-119276 | 4/2004 |
| JP | 2004-127659 | 4/2004 |
| JP | 2004-127659 A | 4/2004 |
| WO | WO 03/057745 A1 | 7/2003 |
| WO | WO2004/000857 | 12/2003 |

* cited by examiner

FUEL FOR FUEL CELL, FUEL CELL AND APPLICATION THEREOF

CROSS REFERENCE TO RELATED APPLICATION

This is a continuation application of PCT/JP2004/018021 filed on Dec. 3, 2004.

TECHNICAL FIELD

The present invention (first aspect) relates to fuel cell fuels and to methods for supplying the fuels. In particular, the invention relates to a fuel cell fuel that can overcome problems in handling of organic fuels such as methanol used in the fuel cell, of corrosion of peripheral equipment, and of crossover in the cell, and that allows fuel cells to enhance the power generation efficiency and to operate safely, and to a method for supplying the fuel cell fuel to a fuel cell.

The present invention (second aspect) relates to methods for detecting the fuel material content in a fuel cell fuel composition, and particularly to a method for simply detecting the remaining quantity of the fuel material to be supplied to a fuel cell, such as methanol.

The present invention (third aspect) relates to fuels for solid-electrolyte fuel cells, solid-electrolyte fuel cells, and methods for using the fuels. In particular, the invention relates to a solid-electrolyte fuel cell fuel that can reduce the crossover in solid-electrolyte fuel cells, to a solid-electrolyte fuel cell using the fuel, and to a method for using the fuel.

The present invention (fourth aspect) relates to a method for relatively easily releasing a fuel cell fuel from a fuel composition containing the fuel cell fuel.

BACKGROUND ART

A solid polymer electrolyte fuel cell includes a solid electrolyte membrane, such as a perfluorosulfonic acid membrane, acting as an electrolyte, and a fuel electrode and an oxidizing electrode that are bonded to the respective sides of the solid electrolyte membrane. The solid polymer electrolyte fuel cell generates power by electrochemical reaction while a liquid organic fuel, such as hydrogen or methanol, is being supplied to the anode and oxygen is being supplied to the cathode.

Among fuel cells, a type represented by a direct methanol fuel cell has been actively developed in which a liquid organic fuel is directly supplied to the fuel electrode without being reformed. Since this type of fuel cell is designed so that the liquid organic fuel is directly supplied to the fuel electrode, no device such as reformer is required. Accordingly, the cell advantageously can be simple in structure and can be downsized. In addition, the liquid organic fuel, which is used as the fuel in this type of fuel cell, can be more easily and safely delivered than gas fuels, such as hydrogen gas and hydrocarbon gases.

In the fuel cell, electrochemical reactions occur at the respective electrodes. If, for example, methanol is used, the anode causes the reaction:

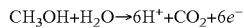  [1]

The cathode causes the reaction:

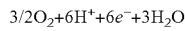  [2]

In order to induce these reactions, each electrode is made of a mixture of carbon particles supporting a catalyst and a solid polymer electrolyte.

If such a solid polymer electrolyte fuel cell uses methanol as the fuel, the methanol supplied to the anode (fuel electrode) reaches the catalyst through the pores in the electrode. Then, the methanol is decomposed by the catalyst to generate electrons and hydrogen ions as expressed by the above reaction formula [1]. The hydrogen ions reach the cathode (oxidizing electrode) via the electrolyte in the anode and across the solid electrolyte membrane between the two electrodes, and react with oxygen supplied to the cathode and electrons coming from an external circuit to produce water as expressed by the above reaction formula [2]. On the other hand, the electrons released from the methanol are extracted to the external circuit via the supported catalyst in the anode, and flow into the cathode from the external circuit. Consequently, electrons flow in the external circuit from the anode to the cathode, and power is extracted.

The direct methanol fuel cell using methanol as the fuel has a large possibility of being used as a portable small-size fuel cell, and is accordingly actively developed as a next-generation secondary battery used for, for example, portable computers and cellular phones.

In general, a fuel cell using a liquid organic fuel includes a solid polymer electrolyte membrane made of a solid polymer ion-exchange resin as the electrolyte. To ensure fuel cell functions, in this instance, it is necessary that the hydrogen ions generated from the fuel electrode (anode) transfer to the oxidizing electrode (cathode) across the membrane. It is known that the transfer of hydrogen ions is accompanied with the transfer of water, and the electrolyte membrane needs to contain a certain amount of water.

In use of a liquid organic fuel with high affinity to water, such as methanol, however, the liquid organic fuel diffuses in the solid polymer electrolyte membrane containing water, and finally reaches the oxidizing electrode. This phenomenon is called crossover. The crossover causes the liquid organic fuel, which is originally intended to provide electrons to the fuel electrode, to transfer to the oxidizing electrode, thereby oxidizing the liquid organic fuel. The resulting fuel cannot be used effectively, and accordingly causes the fuel cell to reduce the voltage or power and the fuel efficiency. The crossover of methanol becomes more pronounced as methanol concentration in the fuel is increased. It is therefore difficult that the direct methanol fuel cell uses methanol fuel at high concentrations.

In order to overcome the problem with methanol crossover, a variety of approaches have been proposed as follows:

[1] A method of improving the electrolyte membrane between the anode and the cathode and its structure (Japanese Unexamined Patent Application Publication Nos. 11-26005, 2002-83612, etc.).

[2] A method of supplying a liquid fuel to the anode, and in which the liquid fuel is vaporized by a vaporizer or heater and then supplied (Japanese Unexamined Patent Application Publication No. 2001-93541, for example).

[3] A method of replacing methanol with any other alcohol (isopropanol, Japanese Unexamined Patent Application Publication No. 2003-217642) or any other organic fuel (cycloparaffins, Japanese Unexamined Patent Application Publication No. 2003-323896).

[4] A method of suppressing the crossover by adding a sugar, an alcohol, or the like to the liquid organic fuel and thus using osmotic pressure in the fuel cell (Japanese Unexamined Patent Application Publication No. 2004-39293).

These methods however do not sufficiently overcome the methanol crossover, and further improvement is required.

In addition to the methanol crossover, the direct methanol fuel cell using methanol as the fuel has other problems:

(1) Undiluted methanol is designated as a deleterious substance under Japanese Poisonous and Deleterious Substances Control Law and classified in hazard category 4, and therefore should be handled with due care; and (2) Since methanol is liquid, an airtight container preventing leakage is required.

These two are problems in handling methanol.

(3) If a methanol aqueous solution with a high concentration is used to enhance the power generation efficiency, the electrodes of the fuel cell can be damaged or the peripheral metals may be corroded.

In addition, the following problem may occur.

(4) Methanol used as the fuel is generally in a form of aqueous solution of about 10% to 30% by weight. This is because the methanol crossover becomes pronounced as the methanol concentration is increased; because undiluted methanol is designated as a deleterious substance under Japanese Poisonous and Deleterious Substances Control Law and classified in hazard category 4, and therefore should be handled with due care; and because high concentration methanol disadvantageously causes corrosion or the like. However, a methanol aqueous solution of such a low concentration may disadvantageously freeze particularly in cold climates. The frozen methanol solution cannot be used as the fuel, and needs to be unfrozen before use. Also, the methanol solution disadvantageously produces concentration distributions in methanol and water during being frozen. In order to eliminate the concentration distributions, the frozen fuel needs to be unfrozen completely, and is then homogenized by, for example, shaking the container. Thus, methanol is complicated to use.

Although other organic fuels than methanol can produce the same problems (1) to (4), the problems are not solved in the known fuel cells.

In addition, there has been no method for easily detecting the remaining quantity of the fuel cell fuel. Accordingly, it is difficult to prepare a necessary amount of fuel or to supply the fuel appropriately before it is completely consumed so that the fuel is supplied at appropriate timing.

Furthermore, known fuel cells have the following problems.

Hydrogen and methanol, which are used as fuel cell fuels, are dangerous and have many problems in handling. In order to store such fuels safely, methods have been disclosed of turning the fuel into a molecular compound (WO2004000857) or of gelate the fuel by allowing a polymer to absorb the fuel (Japanese Unexamined Patent Application Publication No. 2004-127659). In order to release the fuel cell fuel from such a stable composition prepared from the fuel cell fuel, in general, the fuel composition is heated.

However, heating the fuel composition containing the fuel cell fuel to release the fuel requires a heating apparatus and high energy for heating. This is industrially disadvantageous. A simple method is desired for releasing a fuel from a fuel composition containing a fuel cell fuel.

DISCLOSURE OF INVENTION

Objects of the Invention (1) The object of a first aspect is to provide a fuel cell fuel and a method for supplying the fuel. The fuel cell fuel and the method can improve the handling of fuel cell fuel containing organic fuel, and overcome problems, such as corrosion, freezing of the fuel, and crossover.

(2) The object of a second aspect is to provide a method for easily detecting the remaining quantity of fuel cell fuel.

(3) An object of a third aspect is to provide a solid-electrolyte fuel cell fuel that can reduce its crossover in the solid-electrolyte fuel cell, and to achieve a fuel cell exhibiting high power and high fuel efficiency. Another object of the third aspect is to provide a method for using solid-electrolyte fuel cells using such a fuel and to a solid-electrolyte fuel cell using the fuel.

(4) The object of the fourth aspect is to provide a method for easily releasing a fuel cell fuel from a fuel composition containing the fuel cell fuel, without use of a heating apparatus or heating energy.

SUMMARY OF THE INVENTION

<1> A fuel cell fuel according to the first aspect contains an organic fuel used for a fuel cell. The organic fuel is in a form of a solid molecular compound.

A method for supplying the fuel cell fuel according to the first aspect includes the step of releasing the organic fuel from the fuel cell fuel and supplying the organic fuel to a fuel electrode of a fuel cell.

<2> A method for detecting the content of a fuel cell fuel material in a fuel cell fuel composition, according to a second aspect detects the content of a fuel cell fuel material in a fuel composition containing a molecular compound formed of the fuel cell fuel material and a counterpart compound. The method includes the step of comparing an indexical property of the molecular compound and/or the counterpart compound with the indexical property of the fuel composition.

<3> A solid-electrolyte fuel cell fuel according to a third aspect contains a liquid organic fuel, and a compound forming a complex or molecular compound with the liquid organic fuel.

A method for using a solid-electrolyte fuel cell according to the third aspect is applied to a solid-electrolyte fuel cell including a fuel electrode, an oxidizing electrode, and a solid electrolyte membrane held between the fuel electrode and the oxidizing electrode. The method includes the step of supplying the solid-electrolyte fuel cell fuel to the fuel electrode.

A solid-electrolyte fuel cell according to the third aspect includes a fuel electrode, an oxidizing electrode, a solid electrolyte membrane held between the fuel electrode and the oxidizing electrode, and the solid-electrolyte fuel cell fuel.

Another solid-electrolyte fuel cell according to the third aspect includes a fuel electrode, an oxidizing electrode, a solid electrolyte membrane held between the fuel electrode and the oxidizing electrode, and fuel supply means for supplying the solid-electrolyte fuel cell fuel to the fuel electrode.

<4> A method for releasing a fuel cell fuel from a fuel cell fuel composition containing the fuel, according to the fourth aspect includes the step of releasing the fuel to water by bringing the fuel cell fuel composition into contact with the water.

BEST MODE FOR CARRYING OUT THE INVENTION

Figure 1:
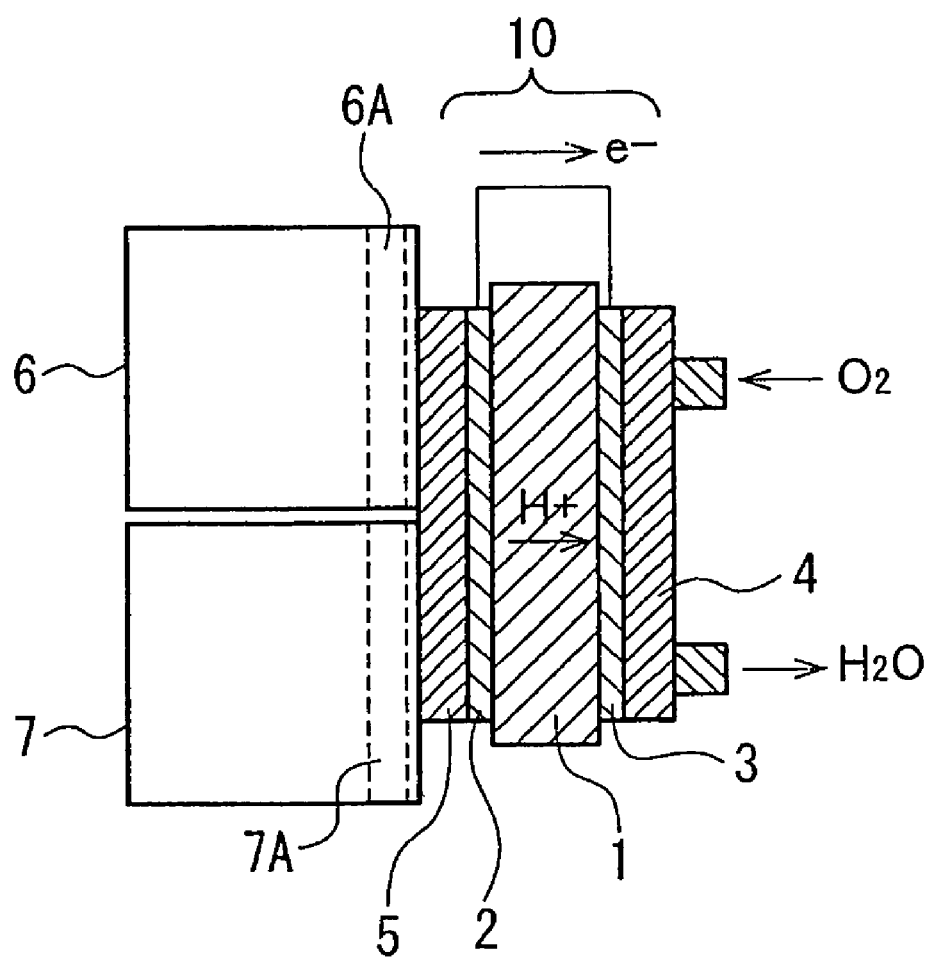
FIG. 1 is a schematic sectional view of a fuel cell system prepared in Examples 5 and 11.

Preferred embodiments of the present invention will now be described in detail.

[1] First, a fuel cell fuel and a method for supplying the fuel cell fuel according to a first aspect will be described.

The fuel cell fuel according to the first aspect contains an organic fuel, which is used in fuel cells, and the organic fuel is in a form of a solid molecular compound.

Since the organic fuel of the fuel cell fuel of the first aspect is in a form of a solid molecular compound, it can be safe and easy to handle, store, and transport. In addition, it is not likely to freeze. Furthermore, the problems of corrosion and crossover can be alleviated, and accordingly the organic fuel can be used in high concentrations to increase the electromotive force of fuel cells.

In the method for supplying the fuel cell fuel, the organic fuel is released from the fuel cell fuel and supplied to a fuel electrode of a fuel cell. By using the safe fuel cell fuel easy to handle, efficient fuel supply can be achieved.

The molecular compound used herein refers to a compound prepared from at least two solely stable compounds with a bond other than the covalent bond, formed by a relatively weak interaction, such as a hydrogen bond or a Van der Waals force. Such molecular compounds include hydrates, solvated compounds, addition compounds, and inclusion compounds. The molecular compound can be prepared by a contact catalytic reaction of a compound for forming the molecular compound with the organic fuel. The molecular compound allows the liquid organic fuel to be in a solid compound to store the organic fuel stably in a relatively lightweight form. The molecular compound easily releases the organic fuel by heating or coming into contact with water, and the organic fuel is supplied to the fuel electrode of the fuel cell. Among such molecular compounds is an inclusion compound enclosing the organic fuel, formed by a contact catalytic reaction of a host compound and the organic fuel.

Any type can be used as the organic fuel according to the first aspect as long as it can be used as the fuel for fuel cells, and examples of the organic fuel include, but not limited to, alcohols, ethers, hydrocarbons, and acetals. Organic fuels are generally liquid at normal pressure and temperature. Exemplary organic fuels include alcohols, such as methanol, ethanol, n-propanol, isopropanol, and ethylene glycol; ethers, such as dimethyl ether, methyl ethyl ether, and diethyl ether; hydrocarbons, such as propane and butane; and acetals, such as dimethoxymethane and trimethoxymethane. These organic fuels may be used singly or in combination.

In the solid molecular compound constituting the fuel cell fuel, the host compound for forming the inclusion compound enclosing the organic fuel may be an organic compound, an inorganic compound, or an organic-inorganic complex compound. The organic host compound may be a monomolecular, a multimolecular, or a polymeric host.

Among the organic host compounds, exemplary monomolecular host compounds include cyclodextrins, crown ethers, cryptands, cyclophanes, azacyclophanes, calixarenes, cyclotriveratrylenes, spherands, and cyclic oligopeptides. Exemplary multimolecular host compounds include ureas, thioureas, deoxycholic acids, perhydrotriphenylenes, tri-o-thymotides, bianthryls, spirobifluorenes, cyclophosphazenes, monoalcohols, diols, acetylene alcohols, hydroxybenzophenones, phenols, bisphenols, trisphenols, tetrakisphenols, polyphenols, naphthols, bisnaphthols, diphenylmethanols, carboxylic amides, thioamides, bixanthenes, carboxylic acids, imidazoles, and hydroquinones. Exemplary polymeric host compounds include celluloses, starches, chitins, chitosans, polyvinyl alcohols, polyethylene glycol arm polymers having 1,1,2,2-tetrakisphenylethane as the core, and polyethylene glycol arm polymers having $\alpha,\alpha,\alpha',\alpha'$-tetrakisphenylxylene as the core.

The organic host compounds further include organophosphorus compounds and organosilicon compounds.

Exemplary inorganic host compounds include titanium oxide, graphite, alumina, transition-metal dichalcogenite, lanthanum fluoride, clay minerals (montmorillonite, etc.), silver salts, silicates, phosphates, zeolite, silica, and porous glass.

Some organic metal compounds have the nature of the host compound. Such organic metal compounds include organoaluminum compounds, organotitanium compounds, organoboron compounds, organozinc compounds, organoindium compounds, organogallium compounds, organotellurium compounds, organotin compounds, organozirconium compounds, and organomagnesium compound. Metal salts of organic carboxylic acids and organic metal complexes may be used as the host compound. The organic metal host compound is not particularly limited to these compounds.

Among these host compounds, preferred are multimolecular host compounds whose inclusion ability does not easily depend on the molecular size of the guest compound.

Exemplary multimolecular host compounds include urea, 1,1,6,6-tetraphenylhexa-2,4-diyne-1,6-diol, 1,1-bis(2,4-dimethylphenyl)-2-propyne-1-ol, 1,1,4,4-tetraphenyl-2-butyne-1,4-diol, 1,1,6,6-tetrakis(2,4-dimethylphenyl)-2,4-hexadiyne-1,6-diol, 9,10-diphenyl-9,10-dihydroanthracene-9,10-diol, 9,10-bis(4-methylphenyl)-9,10-dihydroanthracene-9,10-diol, 1,1,2,2-tetraphenylethane-1,2-diol, 4-methoxyphenol, 2,4-dihydroxybenzophenone, 4,4'-dihydroxybenzophenone, 2,2'-dihydroxybenzophenone, 2,2',4,4'-tetrahydroxybenzophenone, 1,1-bis(4-hydroxyphenyl)cyclohexane, 4,4'-sulfonylbisphenol, 2,2'-methylenebis(4-methyl-6-t-butylphenol), 4,4'-ethylidenebisphenol, 4,4'-thiobis(3-methyl-6-t-butylphenol), 1,1,3-tris(2-methyl-4-hydroxy-5-t-butylphenyl)butane, 1,1,2,2-tetrakis(4-hydroxyphenyl)ethane, 1,1,2,2-tetrakis(4-hydroxyphenyl)ethylene, 1,1,2,2-tetrakis(3-methyl-4-hydroxyphenyl)ethane, 1,1,2,2-tetrakis(3-fluoro-4-hydroxyphenyl)ethane, $\alpha,\alpha,\alpha',\alpha'$-tetrakis(4-hydroxyphenyl)-p-xylene, tetrakis(p-methoxyphenyl)ethylene, 3,6,3',6'-tetramethoxy-9,9'-bi-9H-xanthene, 3,6,3',6'-tetraacetoxy-9,9'-bi-9H-xanthene, 3,6,3',6'-tetrahydroxy-9,9'-bi-9H-xanthene, gallic acid, methyl gallate, catechin, bis-β-naphthol, $\alpha,\alpha,\alpha',\alpha'$-tetraphenyl-1,1'-biphenyl-2,2'-dimethanol, bisdicyclohexylamide diphenate, bisdicyclohexylamide fumarate, cholic acid, deoxycholic acid, 1,1,2,2-tetraphenylethane, tetrakis(p-iodophenyl)ethylene, 9,9'-bianthryl, 1,1,2,2-tetrakis(4-carboxyphenyl)ethane, 1,1,2,2-tetrakis(3-carboxyphenyl)ethane, acetylenedicarboxylic acid, 2,4,5-triphenylimidazole, 1,2,4,5-tetraphenylimidazole, 2-phenylphenanthro[9,10-d]imidazole, 2-(o-cyanophenyl)phenanthro[9,10-d]imidazole, 2-(m-cyanophenyl)phenanthro[9,10-d]imidazole, 2-(p-cyanophenyl)phenanthro[9,10-d]imidazole, hydroquinone, 2-t-butylhydroquinone, 2,5-di-t-butylhydroquinone, and 2,5-bis(2,4-dimethylphenyl)hydroquinone.

Among these host compounds, advantageous in inclusion ability are phenolic host compounds, such as 1,1-bis(4-hydroxyphenyl)cyclohexane, 1,1,2,2-tetrakis(4-hydroxyphenyl)ethane, and 1,1,2,2-tetrakis(4-hydroxyphenyl)ethylene; amidic host compounds, such as bis(dicyclohexylamide) diphenate, and bisdicyclohexylamide fumarate; and imidazolic host compounds, such as 2-(m-cyanophenyl)phenanthro[9,10-d]imidazole. In particular, phenolic host compounds, such as 1,1-bis(4-hydroxyphenyl)cyclohexane are advantageous because they are easy to use in industrial applications.

These host compounds may be used singly or in combination.

The host compound may be in any form as long as it can form a solid inclusion compound with the organic fuel.

Among the above-listed host compounds, organic host compounds may be supported in a porous material and thus used in a form of organic-inorganic complex. In this instance, porous materials for supporting the organic host compound include, but not limited to, silica, zeolite, activated carbon, clay minerals, and intercalation complexes such as montmorillonites. In order to prepare the organic-inorganic complex, for example, any one of the above-listed organic host compounds is dissolved in a solvent, and the solution is impregnated into a porous material, followed by, for example, drying the solvent or drying under reduced pressure. The amount of the organic host compound supported in the porous material is not particularly limited, but is generally about 10% to 80% by weight to the amount of the porous material.

In order synthesize the inclusion compound with the organic fuel using the host compound such as 1,1-bis(4-hydroxyphenyl)cyclohexane, the organic fuel and the host compound may be brought into direct contact and mixed with each other. Thus, the inclusion compound enclosing the organic fuel can be easily synthesized. For the synthesis of the inclusion compound, alternatively, the host compound may be dissolved in the organic fuel with heating and recrystallized.

The temperature at which the organic fuel and the host compound are brought into contact for the synthesis of the inclusion compound is not particularly limited, but it is preferably between room temperature and about 100° C. The pressured at this point also is not particularly limited, but preferably normal pressure. How long the organic fuel and the host compound are in contact with each other is not particularly limited, but preferably about 0.01 to 24 hours from the viewpoint of working efficiency.

The organic fuel to be brought into contact with the host compound preferably has a high purity. However, if the host compound has an ability to selectively enclose the organic fuel, the organic fuel may be in a form of a liquid mixture containing any other constituent.

The thus prepared inclusion compound generally encloses 0.1 to 10 mol of molecules of the organic fuel relative to 1 mol of the host compound, depending on the type of the host compound used, conditions for contact with the organic fuel, and the like.

The resulting inclusion compound allows the organic fuel to be stably stored under conditions of room temperature and normal pressure over a long time. The inclusion compound is in a solid form that is lightweight and easy to handle. Accordingly, the inclusion compound can be easily stored in a container, such as of glass, metal, or plastic, and thus the problem of leakage can be overcome. In addition, by enclosing the organic fuel, which is normally liquid, to turn it solid, its deleterious or hazardous nature can be hidden. Furthermore, the chemical reactivity of the organic fuel can be reduced. For example, the corrosiveness to metals can be alleviated.

As for the method of the present invention, the organic fuel contained in the solid molecular compound, such as an inclusion compound can be extracted by any method, and for example, by heating the solid molecular compound. Specifically, if the solid molecular compound is an inclusion compound, it can be generally heated to room temperature to about 200° C., depending on the type of the host compound used. Thus the organic fuel can be released from the inclusion compound and be used for various applications. In this instance, heating can be performed by, but not particularly limited to, use of a thermionic element (such as a peltier element) or ink-jet printer head (such as that by thermal system), or a combined use with a surface acoustic wave device or the like.

Alternatively, the organic fuel can be extracted into water by bringing the solid molecular compound, such as an inclusion compound, into contact with water. In this instance, the water may be an aqueous solution of the organic fuel. By extracting the organic fuel from the molecular compound, such as an inclusion compound, an organic fuel aqueous solution with an intended concentration, for example, about 1% to 64% by weight, can be appropriately prepared, and the organic fuel aqueous solution can be supplied to a fuel cell.

The host compound after releasing the organic fuel from the inclusion compound has an ability to selectively enclose the organic fuel and can be advantageously recycled for enclosing the organic fuel.

The first aspect can produce the following effects to increase the power generation efficiency of the fuel cell and allow its long-term stable operation.

(1) By turning a liquid organic fuel into a solid form, the leakage of the liquid can be prevented. Consequently, no airtight container is required.

(2) Since the organic fuel is in a form of solid molecular compound, it can be safe and easy to use, and special handling relevant to safety for the deleterious or harmful natures of the organic fuel can be eliminated. Also, the problem of freezing of the organic fuel aqueous solution can be solved, and stable fuel supply can be achieved in cold climates.

(3) The molecular compound can alleviate the chemical reactivity of the organic fuel. Accordingly the effects of the organic fuel on the electrode and other components of the fuel cell can be reduced and, thus, the corrosion of peripheral metals or the like can be reduced.

(4) The crossover in the cell can be reduced.

(5) The organic fuel can be used in high concentration and the high concentration organic fuel can be brought into contact with the fuel electrode to increase the electromotive force of the fuel cell.

The first aspect is useful as a fuel cell fuel for solid polymer electrolyte fuel cells, particularly for direct methanol fuel cells that are thought of for portable small-size fuel cells, and as a method for supplying the fuel cell fuel. Furthermore, the first aspect can be applied to a variety of fuel cells using organic fuels without being limited to those applications.

The first aspect will be further described in detail with reference to the following Examples. However, the first aspect is not limited to the Examples unless it is beyond the scope.

In the following Examples, 1,1-bis(4-hydroxyphenyl)cyclohexane (hereinafter abbreviated to "BHC") or 1,1,6,6-tetraphenylhexa-2,4-diyne-1,6-diol (hereinafter abbreviated to "TPHDD") was used as the host compound enclosing the organic fuel, and methanol was used as the organic fuel.

Example 1

Methanol Inclusion Compound Synthesis 1

In 50 ml of methanol, 26.8 g (0.1 mol) of BHC was dissolved with heating and was recrystallized to prepare a solid methanol inclusion compound of BHC:methanol=1:1 (on a molar basis) with a methanol content of 11% by weight.

Example 2

Methanol Inclusion Compound Synthesis 2

In a beaker were placed 26.8 g (0.1 mol) of BHC and 3.2 g (0.1 mol) of methanol, followed by stirring and mixing with a stirrer. A solid methanol inclusion compound of BHC:methanol=1:1 (on a molar basis) was obtained.

Example 3

Methanol Inclusion Compound Synthesis 3

In 100 ml of methanol, 41.4 g (0.1 mol) of TPHDD was dissolved with heating and was recrystallized to prepare a solid methanol inclusion compound of TPHDD:methanol=1:2 (on a molar basis) with a methanol content of 13% by weight.

Example 4

Characteristics of Methanol Thermally Released from Methanol Inclusion Compound

The methanol inclusion compound prepared in Example 1 was subjected to TG-DTA measurement at a heating rate of 10° C./min. As a result, it was found that the enclosed methanol was left stably in the compound at temperatures up to about 100° C. and began to be released at 100° C.

Hence, the enclosed methanol in the inclusion compound is prevented from vaporizing, so that the risk of methanol during storage can be reduced, although methanol is inherently a volatile solvent having a boiling point of about 64° C. or less and may be vaporized even at 64° C. because of its low vapor pressure. The above-mentioned Poisonous and Deleterious Substances Control Law designates unprocessed undiluted methanol as a deleterious substance, and methanol is solely subject to the regulation. By enclosing methanol in an inclusion compound, the enclosed methanol is precluded from the regulation. Since the enclosed methanol is in a solid form and its vaporizing and releasing temperature can be controlled, it is also precluded from hazard category 4. Thus, this method can be a technique for safe storage.

The heating temperature for releasing the methanol from the methanol inclusion compound can be arbitrarily set by selecting the host compound.

Example 5

Evaluation for Stability of Fuel Cell Electrode

Electrolyte membrane-electrode assemblies (MEA) for evaluation were prepared by the following manner. A perfluorosulfonic acid-based ion-exchange membrane Nafion was used as the electrolyte membrane. Pt particles were used as the catalyst and supported by acetylene black to give electron conductivity. The amount of supported Pt was set at 50% by weight relative to acetylene black. The Pt-supporting catalyst and 5% by weight Nafion solution were mixed and sprayed onto the electrolyte membrane with a spray brush, thereby forming an electrode layer. After being dried at 90° C. for 1 hour in a dryer, the resulting membrane with the electrode layer was sandwiched between Teflon plates and pressed at 130° C., 20 MPa for 30 minutes with a hot press machine to bond the electrolyte membrane and the electrode.

Thus prepared MEAs (1 cm×1 cm) were immersed in 5%, 10%, 20%, and 50% by weight methanol aqueous solutions respectively and allowed to stand for a week as in the known manner. In result, the electrodes were dissolved in or separated by the respective methanol aqueous solutions. Thus, it was found that use of methanol aqueous solution does not allow long-term stability. These results teach that in order to ensure long-term stability, the fuel should be a methanol aqueous solution with a lower concentration. However, lower concentration does not produce sufficient electromotive force.

Accordingly, a direct methanol fuel cell system for supplying the methanol inclusion compound and water instead of methanol aqueous solution was prepared using the electrolyte membrane-electrode assembly, as shown in FIG. 1. In FIG. 1, 1 denotes the electrolyte membrane; 2, an electrode (anode); 3, an electrode (cathode); 4, an oxidizing agent flow path; and 5, a fuel absorber. An inclusion compound tank 6 and a water tank 7 were provided in contact with the fuel absorber. These tanks 6 and 7 have heaters 6A and 7A respectively to heat the contents in the tanks.

The methanol inclusion compound prepared in Example 1 was placed in the inclusion compound tank 6 and heated to 100° C. with the heater 6A. Thus the methanol was released from the inclusion compound and delivered to the fuel absorber 5, while the water in the water tank 7 was heated to 100° C. with the heater 7A and delivered to the fuel absorber 5. This supply to the fuel absorber 5 was performed in a ratio of methanol:water=20:80 (on a weight basis) and is equivalent to the supply of 20% by weight methanol aqueous solution.

As a result, power generation was performed under optimal conditions with no negative effects on the electrode or no crossover.

The direct methanol fuel cell generally produces an electromotive force of 0.22 V with use of 20% by weight methanol aqueous solution at a current density of 100 mA/cm$^2$. The use of the methanol inclusion compound as shown in FIG. 1 increases the electromotive force to 0.48 V. While the use of 20% by weight methanol aqueous solution causes electrode degradation, crossover, and so forth and has difficulties in stable operation, the use of the methanol inclusion compound can achieve stable operation over a long time without such problems.

In the use of the methanol inclusion compounds prepared in Examples 2 and 3, the same resulted.

Example 6

Evaluation for Stability of Fuel Cell Electrode

Figure 2:
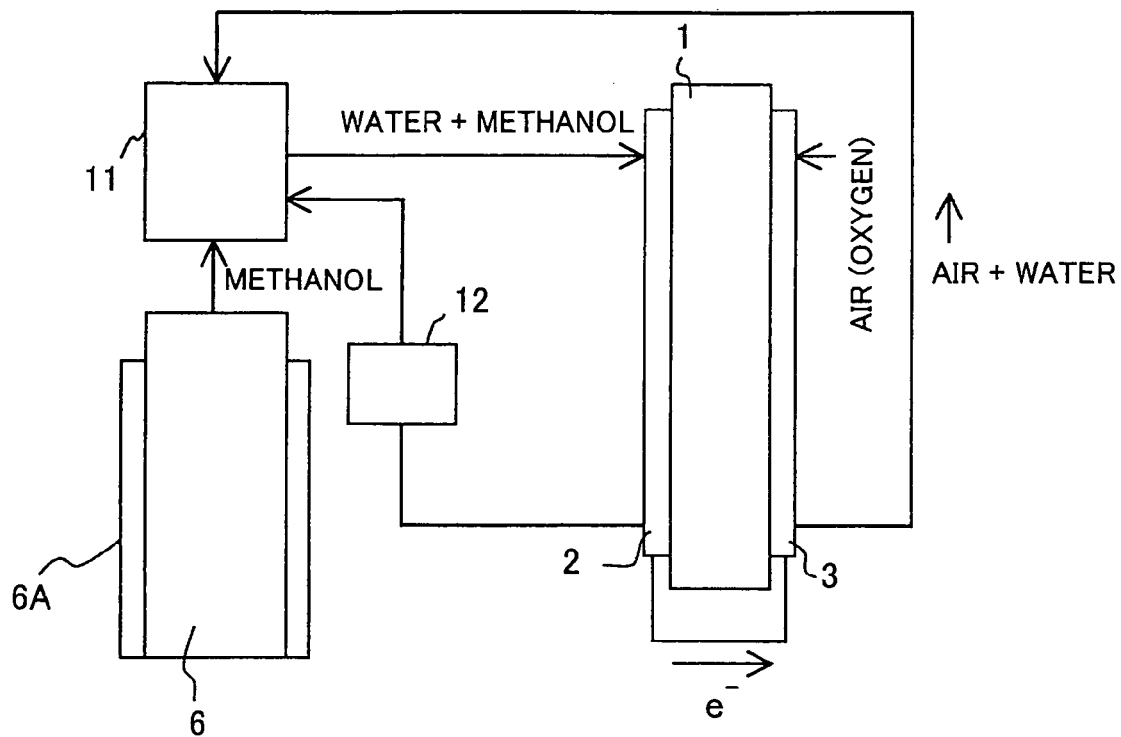
FIG. 2 is a schematic block diagram of a fuel cell system prepared in Examples 6 and 12.

A direct methanol fuel cell system for supplying a methanol aqueous solution was prepared, as shown in FIG. 2, using an electrolyte membrane-electrode assembly (MEA) prepared in the same manner as in Example 5. In FIG. 2, 1 denotes an electrolyte membrane; 2, an electrode (anode); and 3, an electrode (cathode). The oxidizing agent flow path and the fuel absorber are not shown in the figure. In addition, 6 denotes an inclusion compound tank with a heater 6A, 11 denotes a concentration control bath, and 12 denotes $CO_2$ removing means.

The methanol inclusion compound prepared in Example 1 was placed in the inclusion compound tank 6 and heated to 100° C. with the heater 6A. Thus the methanol was released from the inclusion compound and delivered to the concentration control bath 11 to prepare 20% by weight methanol aqueous solution. This solution was delivered to the fuel absorber of the electrolyte membrane-electrode assembly.

The methanol solution used in the anode 2, whose concentration was reduced, was collected, treated by the $CO_2$ removing means 12, and returned to the concentration control bath 11. Water produced in the cathode 3 was also collected in the concentration control bath 11 and used for adjusting the methanol aqueous solution.

As a result, stable operation was performed under optimal conditions over a long time with no negative effects on the electrode or no crossover.

In the use of the methanol inclusion compounds prepared in Examples 2 and 3, the same resulted.

Example 7

Evaluation for Stability of Fuel Cell Electrode

Figure 3:
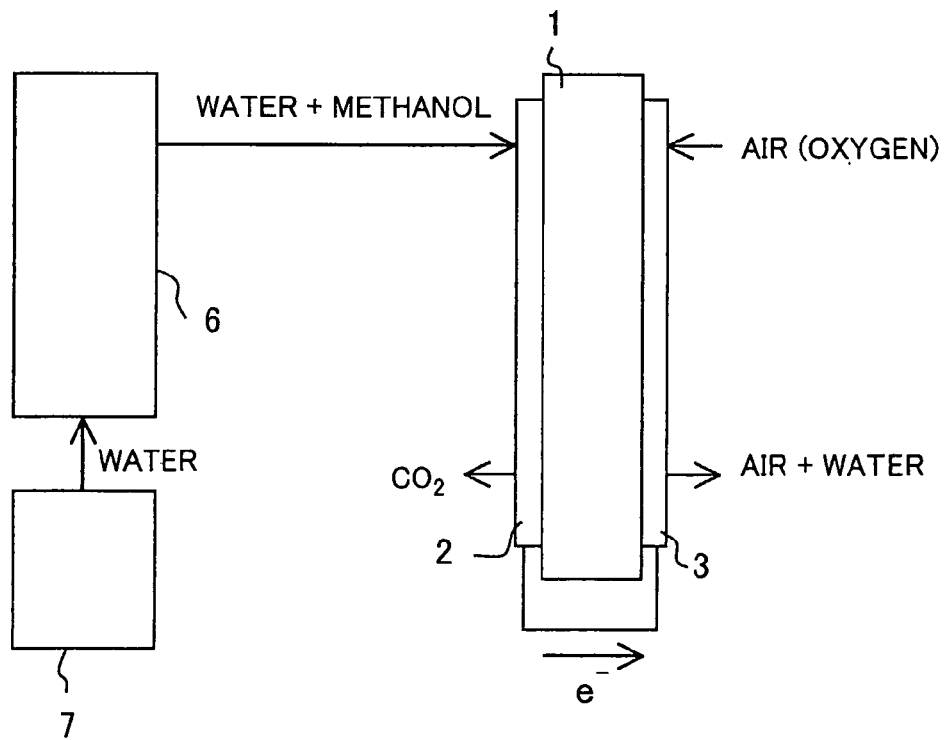
FIG. 3 is a schematic block diagram of a fuel cell system prepared in Examples 7 and 13.

A direct methanol fuel cell system for supplying a methanol aqueous solution was prepared, as shown in FIG. 3, using an electrolyte membrane-electrode assembly (MEA) prepared in the same manner as in Example 5. In FIG. 3, 1 denotes an electrolyte membrane; 2, an electrode (anode); and 3, an electrode (cathode). The oxidizing agent flow path and the fuel absorber are not shown in the figure. In addition, 6 denotes an inclusion compound tank, and 7 denotes a water tank.

The methanol inclusion compound prepared in Example 1 was placed in the inclusion compound tank 6. Water was supplied to the inclusion compound tank 6 from the water tank 7 to bring the methanol inclusion compound into contact with the water so that the methanol was released into the water. Thus, 20% by weight methanol aqueous solution was prepared and delivered to the fuel absorber of the electrolyte membrane-electrode assembly.

The methanol solution used in the anode 2, whose content was reduced, may be collected, treated in a $CO_2$ removing means, and returned to the water tank 7. Water produced in the cathode 3 may be recycled and supplied to the water tank 7.

As a result, stable operation was performed under optimal conditions over a long time with no negative effects on the electrode or no crossover.

In the use of the methanol inclusion compounds prepared in Examples 2 and 3, the same resulted.

Example 8

Freezing Test and Test for Application to Fuel Cell

The methanol inclusion compounds prepared in Examples 1 and 3, and 11% by weight methanol aqueous solution prepared for comparison by mixing methanol to water were placed in respective bottles and allowed to stand in a freezer at −20° C. for 24 hours. While the methanol inclusion compounds of Examples 1 and 3 were not changed, 11% by weight methanol aqueous solution was frozen.

The three samples resulting from the above freezing test were heated to 100° C. and subjected to a test for application to fuel cells in the same manner as in Example 5. While the methanol inclusion compounds of Examples 1 and 3 easily released methanol by heating and the methanol was immediately used, 11% by weight methanol aqueous solution needed time to thaw, and was not able to be used immediately.

The above results suggest that although the organic fuel in a form of a solution produces the problem of freezing, the organic fuel in a form of a solid molecular compound, such as an inclusion compound, does not produce the problem.

[2] A method for detecting the fuel material content in a fuel cell fuel composition according to a second aspect will now be described.

The method for detecting the fuel material content in a fuel cell fuel composition according to the second aspect detects the content of a fuel cell fuel material in a fuel composition containing a molecular compound formed of the fuel cell fuel material and its counterpart compound. This method detects the fuel material content by comparing an indexical property of the molecular compound and/or the counterpart compound with the indexical property of the fuel composition.

The molecular compound used herein refers to a compound prepared from at least two solely stable compounds with a bond other than the covalent bond, formed by a relatively weak interaction, such as a hydrogen bond or a Van der Waals force. Such molecular compounds include hydrates, solvated compounds, addition compounds, and inclusion compounds. The molecular compound can be prepared by a contact catalytic reaction of a counterpart compound for forming the molecular compound with the fuel material, and has a variety of advantages. The molecular compound, for example, allows a liquid fuel material to be in a solid compound to store the fuel material stably in a relatively lightweight form. The molecular compound easily releases the fuel material by heating or coming into contact with water, and the fuel material is supplied to the fuel electrode of the fuel cell.

The fuel cell according to the second aspect is not particularly limited, but preferably a type of solid polymer electrolyte fuel cell, including a direct methanol fuel cell.

First, the molecular compound according to the second aspect will be described which is contained in a fuel cell fuel composition and formed of a fuel cell fuel material and its counterpart compound.

Any material can be used as the fuel material according to the second aspect as long as it can be used as a fuel for fuel cells. Examples of the fuel material include, but not limited to, hydrogen, alcohols, ethers, hydrocarbons, and acetals. More specifically, exemplary fuel materials include hydrogen; alcohols, such as methanol, ethanol, n-propanol, isopropanol, and ethylene glycol; ethers, such as dimethyl ether, methyl ethyl ether, and diethyl ether; hydrocarbons, such as propane and butane; and acetals, such as dimethoxymethane and trimethoxymethane. These fuel materials may be used singly or in combination.

The molecular compound contained in the fuel composition contains a host compound for forming the inclusion compound enclosing the fuel material. Exemplary host compounds include organic compounds, inorganic compounds, and organic-inorganic complex compounds. Organic host compounds include monomolecular, multimolecular, and polymeric hosts.

Exemplary monomolecular host compounds include cyclodextrins, crown ethers, cryptands, cyclophanes, azacyclophanes, calixarenes, cyclotriveratrylenes, spherands, and cyclic oligopeptides. Exemplary multimolecular host compounds include ureas, thioureas, deoxycholic acids, perhydrotriphenylenes, tri-o-thymotides, bianthryls, spirobifluorenes, cyclophosphazenes, monoalcohols, diols, acetylene alcohols, hydroxybenzophenones, phenols, bisphenols, trisphenols, tetrakisphenols, polyphenols, naphthols, bisnaphthols, diphenylmethanols, carboxylic amides, thioamides, bixanthenes, carboxylic acids, imidazoles, and hydroquinones. Exemplary polymeric host compounds include celluloses, starches, chitins, chitosans, polyvinyl alcohols, polyethylene glycol arm polymers having 1,1,2,2-tetrakisphenylethane as the core, and polyethylene glycol arm polymers having α,α,α',α'-tetrakisphenylxylene as the core.

In addition, the organic host compounds further include organophosphorus compounds and organosilicon compounds.

Exemplary inorganic host compounds include titanium oxide, graphite, alumina, transition-metal dichalcogenite, lanthanum fluoride, clay minerals (montmorillonite, etc.), silver salts, silicates, phosphates, zeolite, silica, and porous glass.

Some organic metal compounds have the nature of the host compound. Such organic metal compounds include organoaluminum compounds, organotitanium compounds, organoboron compounds, organozinc compounds, organoindium compounds, organogallium compounds, organotellurium compounds, organotin compounds, organozirconium compounds, and organomagnesium compound. Metal salts of organic carboxylic acids and organic metal complexes may be used as the host compound. The organic metal host compound is not particularly limited to these compounds.

In use of the fuel composition according to the second aspect, the fuel material released from the molecular compound formed of the fuel material and its counterpart compound is supplied to a fuel cell, thereby generating electric power. The counterpart compound and the molecular compound after the release of the fuel material from the molecular compound exhibit different properties in color, crystal form, and the like. Accordingly, the second aspect is intended to detect the fuel material content in the fuel composition by use of the changes of such indexical properties. Let the indexical property of the molecular compound formed of the fuel material and the counterpart compound be "$S_{100}$" and let the indexical property of the counterpart compound be "$S_0$". When the fuel composition has an indexical property of "$S_{100}$" the fuel material is saturated in the fuel composition. When the fuel composition has an indexical property of "$S_0$", the fuel composition contains only the counterpart compound with no fuel material, that is, in a state of the residue after the release of the fuel material. When the indexical property of the fuel composition lies between "$S_{100}$" and "$S_0$", the fuel composition contains an amount of the fuel material according to the indexical property.

These indexical properties can be easily quantified by, for example, converting them into electrical signals. The type of indexical property is not particularly limited, but preferably color is used as the indexical property. Color can be easily known by visual observations of the appearance of the fuel composition and thus tell the state of the remaining fuel material.

In order to use color as the indexical property, it is preferable that the counterpart compound have different colors between when the counterpart compound is present alone (after the fuel material is released from the molecular compound, or in a state in which the counterpart compound does not form the molecular compound with the fuel material) and when the counterpart compound forms the molecular compound with the fuel material.

Host compounds having chromogenic functional groups are suitably used as the host compound whose color can change. For example, such a host compound can be, but not limited to, an imidazolic compound having a chromogenic functional group and expressed by the following general formula (1):

[Chemical formula 1]

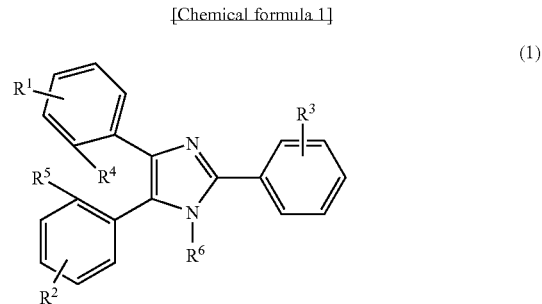

(1)

[In formula (1), $R^1$, and $R^2$ may be the same or different, and each represent hydrogen, methoxy, amino, dimethylamino, nitro, or halogen.

$R^3$ represents nitro, cyano, ethoxycarbonyl, acetyl, or formyl.

$R^4$ and $R^5$ each represent hydrogen, or are bound to each other to form a condensed ring.

$R^6$ represents hydrogen, an alkyl group having a carbon number of 1 to 4, a phenyl group, or a phenyl group substituted with at least one selected from the group consisting of methoxy, amino, dimethylamino, nitro, and halogens.]

Examples of the imidazolic host compound expressed by general formula (1) include, but not limited to, 4,5-bis(4-methoxyphenyl)-2-(2-nitrophenyl)imidazole, 4,5-bis(4-methoxyphenyl)-2-(3-nitrophenyl)imidazole, 4,5-bis(4-methoxyphenyl)-2-(4-nitrophenyl)imidazole, 4,5-bis(4-aminophenyl)-2-(2-nitrophenyl)imidazole, 4,5-bis(4-aminophenyl)-2-(3-nitrophenyl)imidazole, 4,5-bis(4-methoxyphenyl)-2-(4-nitrophenyl)imidazole, 4,5-bis(4-methoxyphenyl)-2-(2-nitrophenyl)-1-methylimidazole, 4,5-bis(4-methoxyphenyl)-2-(3-nitrophenyl)-1-methylimidazole, 4,5-bis(4-methoxyphenyl)-2-(4-nitrophenyl)-1-methylimidazole, 2-(2-nitrophenyl)phenanthro[9,10-d]imidazole, 2-(3-nitrophenyl)phenanthro[9,10-d]imidazole, 2-(4-nitrophenyl)phenanthro[9,10-d]imidazole, 1-methyl-2-(2-nitrophenyl)phenanthro[9,10-d]imidazole, 1-methyl-2-(3-nitrophenyl)phenanthro[9,10-d]imidazole, 1-methyl-2-(4-nitrophenyl)phenanthro[9,10-d]imidazole, 1-phenyl-2-(2-nitrophenyl)phenanthro [9,10-d]imidazole, 1-phenyl-2-(4-nitrophenyl)phenanthro[9,10-d]imidazole, 1-(4-nitrophenyl)-2-(4-nitro phenyl)phenanthro [9,10-d]imidazole, and 1-(4-methoxyphenyl)-2-(4-nitrophenyl)phenanthro[9,10-d]imidazole.

These host compounds may be used singly or in combination.

These host compounds may be in any form as long as it can form the inclusion compound with the fuel material.

Among the host compounds, organic host compounds may be supported in an inorganic porous material and thus used in a form of organic-inorganic complex. In this instance, porous materials for supporting the organic host compound include, but not limited to, silica, zeolite, activated carbon, clay minerals, and intercalation complexes such as montmorillonites. In order to prepare the organic-inorganic complex, for example, the organic host compound is dissolved in a solvent, and the solution is impregnated into a porous material, followed by, for example, drying the solvent or drying under reduced pressure. The amount of organic host compound supported in the porous material is not particularly limited, but is generally about 10% to 80% by weight relative to the amount of the porous material.

In order to synthesize the inclusion compound with the fuel material using the host compound, such as 4,5-bis(4-methoxyphenyl)-2-(3-nitrophenyl)imidazole, the fuel material and the host compound may be brought into direct contact and mixed with each other. Thus, the inclusion compound enclosing the fuel material can be easily synthesized. For the synthesis of the inclusion compound, alternatively, the host compound may be dissolved in the fuel material with heating and recrystallized.

The temperature at which the fuel material and the host compound are brought into contact for the synthesis of the inclusion compound is not particularly limited, but it is preferably between room temperature and about 100° C. The pressure at this point is not particularly limited, but preferably normal pressure. How long the fuel material and the host compound are in contact with each other is not particularly limited, but preferably about 0.01 to 24 hours from the viewpoint of working efficiency.

The fuel material to be brought into contact with the host compound preferably has a high purity. However, if the host compound has an ability to selectively enclose the fuel material, the fuel material may be in a form of a liquid mixture containing any other constituent.

The thus prepared inclusion compound generally encloses 0.1 to 10 mol of molecules of the fuel material relative to 1 mol of the host compound, depending on the type of the host compound used, conditions for contact with the fuel material, and the like.

The resulting inclusion compound allows the fuel material to be stably stored under conditions of room temperature and normal pressure over a long time. The inclusion compound is lightweight and easy to handle, and is generally in a solid form. Accordingly, the inclusion compound can be stored in a container, such as of glass, metal, or plastic, and thus the problem of leakage can be overcome. In addition, by enclosing the fuel material, which is normally gas or liquid, to turn it solid, its deleterious or hazardous nature can be hidden. Furthermore, the chemical reactivity of the fuel material can be reduced. For example, the corrosiveness to metals can be alleviated.

The method for easily extracting the fuel material from the molecular compound, such as the inclusion compound, is not particularly limited, and the molecular compound may be heated. Specifically, if the molecular compound is an inclusion compound, it can be generally heated to room temperature to about 200° C., depending on the host compound used. Thus the fuel material can be easily released from the inclusion compound and be used for various applications. In this instance, heating can be performed by, but not particularly limited to, use of a thermionic element (peltier element, etc.) or ink-jet printer head (thermal system, etc), or a combined use with a surface acoustic wave device or the like.

Alternatively, the fuel material can be extracted into water by bringing the molecular compound, such as the inclusion compound, into contact with water. In this instance, the water may be an aqueous solution of the fuel material. By extracting the fuel material from the molecular compound, such as the inclusion compound, a fuel material aqueous solution with an intended concentration can be appropriately prepared, and this aqueous solution can be supplied to a fuel cell.

The host compound after releasing the fuel material from the inclusion compound has an ability to selectively enclose the fuel material and can be advantageously recycled for enclosing the fuel material.

The second aspect can easily detect the fuel material content in the fuel composition by comparing an indexical property, such as color, of the fuel composition with the previously obtained indexical property of the counterpart compound, being the residue after the release of the fuel material from the molecular compound, and of the molecular compound formed of the fuel material and the counterpart compound. If the indexical property is color, it can be quantified by use of a color meter or the like, and thus the fuel material content can be accurately determined.

According to the second aspect, the content of the fuel material in the fuel cell fuel composition containing the molecular compound formed of the fuel material and its counterpart compound can be easily detected by comparing the indexical property of the molecular compound and/or the counterpart compound with indexical property of the fuel composition.

In particular, the use of color as the indexical property allows the remaining quantity of the fuel material to be visually and easily known. In this instance, a compound having a chromogenic functional group is preferably used as the counterpart compound to discriminate the colors of the molecular compound and the counterpart compound. This further facilitates the determination of the remaining quantity.

The second aspect is useful as a method for detecting the remaining quantity of the fuel cell fuel for solid polymer electrolyte fuel cells, particularly for direct methanol fuel cells that are thought of for portable small-size fuel cells. In addition to this application, the second aspect can be applied to a variety of fuel cells without particular limitation.

The second aspect will be further described in detail with reference to the following Examples. However, the second aspect is not limited to the Examples unless it is beyond the scope.

In the following Examples, 4,5-bis(4-methoxyphenyl)-2-(3-nitrophenyl)-1H-imidazole (hereinafter abbreviated to "BMNI") was used as the host compound enclosing the fuel material, and methanol was used as the fuel material. The crystal color of BMNI is yellow.

Example 9

BMNI was dissolved in methanol with heating and recrystallized to prepare a solid methanol inclusion compound of BMNI:methanol=1:1 (on a molar basis). The resulting methanol inclusion compound had a deep red color.

The methanol inclusion compound was placed in a container and heated to 100° C., thereby releasing methanol. As methanol was released, the methanol content in the crystals was gradually reduced. Consequently, the deep red color of the crystals in the container was turned into the yellow color of BMNI.

Thus, the remaining quantity of the methanol can be determined from the change in color.

Example 10

A methanol inclusion compound prepared in the same manner as in Example 9 was placed in a column, and water was allowed to flow through the column, thereby extracting methanol into the water. As the methanol was extracted, the methanol content in the crystals was gradually reduced. Consequently, the deep red color of the crystals in the column was turned into the yellow color of BMNI.

Thus, the remaining quantity of the methanol can be determined from the change in color.

Example 11

An electrolyte membrane-electrode assembly (MEA) was prepared in the following manner. A perfluorosulfonic acid ion-exchange membrane Nafion was used as the electrolyte membrane. Pt particles were used as the catalyst and supported by acetylene black to have electron conductivity. The amount of supported Pt was set at 50% by weight relative to acetylene black. The Pt-supporting catalyst and 5% by weight Nafion solution were mixed and sprayed onto the electrolyte membrane with a spray brush, thereby forming an electrode layer. After being dried at 90° C. for 1 hour in a dryer, the resulting membrane with the electrode layer was sandwiched between Teflon plates and pressed at 130° C., 20 MPa for 30 minutes with a hot press machine to bond the electrolyte membrane and the electrode.

A direct methanol fuel cell system for supplying the methanol inclusion compound and water was prepared using the resulting electrolyte membrane-electrode assembly, as shown in FIG. 1. In FIG. 1, 1 denotes the electrolyte membrane; 2, an electrode (anode); 3, an electrode (cathode); 4, an oxidizing agent flow path; and 5, a fuel absorber. An inclusion compound tank 6 and a water tank 7 were provided in contact with the fuel absorber. These tanks 6 and 7 have heaters 6A and 7A respectively to heat the contents in the tanks.

The methanol inclusion compound prepared in Example 9 was placed in the inclusion compound tank 6 and heated to 100° C. with the heater 6A. Thus the methanol was released from the inclusion compound and delivered to the fuel absorber 5, while the water in the water tank 7 was heated to 100° C. with the heater 7A and delivered to the fuel absorber 5. This supply to the fuel absorber 5 was performed in a ratio of methanol:water=20:80 (on a weight basis) and is equivalent to the supply of 20% by weight methanol aqueous solution.

As a result, an electromotive force of 0.48 V was produced at a current density of 100 mA/cm$^2$. In addition, the remaining quantity of the methanol was satisfactorily determined from the change in color of the methanol inclusion compound in the inclusion compound tank 6.

Example 12

A direct methanol fuel cell system for supplying a methanol aqueous solution was prepared, as shown in FIG. 2, using an electrolyte membrane-electrode assembly (MEA) prepared in the same manner as in Example 11. In FIG. 2, 1 denotes an electrolyte membrane; 2, an electrode (anode); and 3, an electrode (cathode). The oxidizing agent flow path and the fuel absorber are not shown in the figure. In addition, 6 denotes an inclusion compound tank with a heater 6A, 11 denotes a concentration control bath, and 12 denotes $CO_2$ removing means.

The methanol inclusion compound prepared in Example 9 was placed in the inclusion compound tank 6 and heated to 100° C. with the heater 6A. Thus the methanol was released from the inclusion compound and delivered to the concentration control bath 11 to prepare 20% by weight methanol aqueous solution. This solution was delivered to the fuel absorber of the electrolyte membrane-electrode assembly.

The methanol solution used in the anode 2, whose concentration was reduce, was collected, treated by the $CO_2$ removing means 12, and returned to the concentration control bath 11. Water produced in the cathode 3 was also collected in the concentration control bath 11 and used for adjusting the methanol aqueous solution.

As a result, electric power was generated with no problems. Also, the remaining quantity of the methanol was determined from the gradual change in color of the inclusion compound from deep red into yellow.

Example 13

A direct methanol fuel cell system for supplying a methanol aqueous solution was prepared, as shown in FIG. 3, using an electrolyte membrane-electrode assembly (MEA) prepared in the same manner as in Example 11. In FIG. 3, 1 denotes an electrolyte membrane; 2, an electrode (anode); and 3, an electrode (cathode). The oxidizing agent flow path and the fuel absorber are not shown in the figure. In addition, 6 denotes an inclusion compound tank and 7 denotes a water tank.

The methanol inclusion compound prepared in Example 9 was placed in the inclusion compound tank 6. Water was supplied to the inclusion compound tank 6 from the water tank 7 to bring the methanol inclusion compound into contact with water. Thus the methanol was released into the water to prepare 20% by weight methanol aqueous solution. This solution was delivered to the fuel absorber of the electrolyte membrane-electrode assembly.

As a result, electric power was generated with no problems. Also, the remaining quantity of the methanol was determined from the gradual change in color of the inclusion compound from deep red into yellow.

[3] A solid-electrolyte fuel cell fuel, a solid-electrolyte fuel cell, and a method for using the solid-electrolyte fuel cell, according to the third aspect will now be described.

The solid-electrolyte fuel cell fuel according to the third aspect contains a liquid organic fuel and a compound forming a complex or molecular compound with the liquid organic fuel.

In the method for using the solid-electrolyte fuel cell of the third aspect, which includes a fuel electrode, an oxidizing electrode, and a solid electrolyte membrane disposed between the fuel electrode and the oxidizing electrode, the solid-electrolyte fuel cell fuel is supplied to the fuel electrode.

The solid-electrolyte fuel cell according to the third aspect includes a fuel electrode, an oxidizing electrode, a solid electrolyte membrane disposed between the fuel electrode and the oxidizing electrode, and the solid-electrolyte fuel cell fuel.

Another solid-electrolyte fuel cell according to the third aspect includes the fuel electrode, the oxidizing electrode, the solid electrolyte membrane between the fuel electrode and the oxidizing electrode, and fuel supply means for supply the solid-electrolyte fuel cell fuel to the fuel electrode.

Hydrogen ion-conductive solid electrolyte membranes represented by Nafion (registered trademark) are generally used for the solid electrolyte membrane of the solid-electrolyte fuel cell. Such a solid electrolyte membrane exhibits high hydrogen ion-conductivity when it is impregnated with water. However, the water in the membrane easily dissolves the liquid organic fuel, such as methanol, consequently causing crossover, as described above, which is a phenomenon that the liquid organic fuel is transferred to the oxidizing electrode across the solid electrolyte membrane.

In the third aspect, a compound (hereinafter may referred to as "trapping compound") that forms a complex or molecular compound with the liquid organic fuel and that cannot permeate the solid electrolyte membrane is dissolved in the liquid organic fuel to be supplied to the fuel electrode. Consequently, a layer trapping the liquid organic fuel is formed between the fuel electrode and the solid electrolyte membrane to prevent the liquid organic fuel from transferring. Thus, the crossover can be reduced.

First, the trapping compound featuring the solid-electrolyte fuel cell fuel of the third aspect will be described.

For the solid-electrolyte fuel cell fuel of the third aspect, any compound can be used as the trapping compound without particular limitation, as long as it can form a complex or molecular compound with the liquid organic fuel. It is however preferable that the trapping compound be selected from compounds other than sulfuric acid, sugars, alcohols, amines, and strong electrolytes, can be dissolved in the liquid organic fuel, and cannot permeate the solid electrolyte membrane, from the viewpoint of trapping efficiency. It is also important that the trapping compound does not corrode the metal members in the fuel cell and is electrochemically stable and involatile. Exemplary trapping compounds include crown ethers, cryptands, cyclophanes, azacyclophanes, calixarenes, cyclotriveratrylenes, spherands, oligopeptides, cyclic oligopeptides, ureas, thioureas, deoxycholic acids, perhydrotriphenylenes, tri-o-thymotides, bianthryls, spirobifluorenes, cyclophosphazenes, hydroxybenzophenones, phenols, bisphenols, trisphenols, tetrakisphenols, polyphenols, naphthols, bisnaphthols, carboxylic amides, thioamides, bixanthenes, carboxylic acids, and hydroquinones.

The molecular compound used herein refers to a compound prepared from at least two solely stable compounds with a bond other than the covalent bond, formed by a relatively weak interaction, such as a hydrogen bond or a Van der Waals force. Such molecular compounds include hydrates, solvated compounds, addition compounds, and inclusion compounds.

The trapping compound according to the third aspect can easily form a complex or molecular compound because of its intermolecular interaction, even if it is dissolved in a liquid organic fuel, a solvent, or the like. Accordingly, an excess of the liquid organic fuel can be trapped to prevent crossover.

Exemplary trapping compounds include urea, thiourea, deoxycholic acid, cholic acid, 2,4-dihydroxybenzophenone, 4,4'-dihydroxybenzophenone, 2,2'-dihydroxybenzophenone, 2,2',4,4'-tetrahydroxybenzophenone, 4-methoxyphenol, 1,1-bis(4-hydroxyphenyl)cyclohexane, 4,4'-sulfonylbisphenol, 2,2'-methylenebis(4-methyl-6-t-butylphenol), 4,4'-ethylidenebisphenol, 4,4'-thiobis(3-methyl-6-t-butylphenol), 1,1,3-tris(2-methyl-4-hydroxy-5-t-butylphenyl)butane, 1,1,2,2-tetrakis(4-hydroxyphenyl)ethane, 1,1,2,2-tetrakis(4-hydroxyphenyl)ethylene, 1,1,2,2-tetrakis(3-methyl-4-hydroxyphenyl)ethane, 1,1,2,2-tetrakis(3-fluoro-4-hydroxyphenyl) ethane, α,α,α',α'-tetrakis(4-hydroxyphenyl)-p-xylene, tetrakis(p-methoxyphenyl)ethylene, 3,6,3',6'-tetramethoxy-9,9'-bi-9H-xanthene, 3,6,3',6'-tetraacetoxy-9,9'-bi-9H-xanthene, 3,6,3',6'-tetrahydroxy-9,9'-bi-9H-xanthene, gallic acid, methyl gallate, catechin, bis-β-naphthol, bisdicyclohexylamide diphenate, bisdicyclohexylamide fumarate, 1,1,2,2-tetraphenylethane, tetrakis(p-iodophenyl)ethylene, 9,9'-bianthryl, 1,1,2,2-tetrakis(4-carboxyphenyl)ethane, 1,1,2,2-tetrakis(3-carboxyphenyl)ethane, acetylenedicarboxylic acid, hydroquinone, 2-t-butylhydroquinone, 2,5-di-t-butylhydroquinone, and 2,5-bis(2,4-dimethylphenyl)hydroquinone.

Among these trapping compounds, advantageous in cost efficiency and formability for the complex or molecular compound are phenols, such as 1,1-bis(4-hydroxyphenyl)cyclohexane, 1,1,2,2-tetrakis(4-hydroxyphenyl)ethane, and 1,1,2,2-tetrakis(4-hydroxyphenyl)ethylene; hydroquinones, such as hydroquinone; and amides, such as bisdicyclohexylamide fumarate.

These trapping compounds may be used singly or in combination.

The liquid organic fuel preferably has a C—H bond. Examples of such a liquid organic fuel include alcohols, such as methanol, ethanol, and propanol; ethers, such as dimethyl ether; cycloparaffins, such as cyclohexane; cycloparaffins having a hydrophilic group, such as hydroxy, carboxyl, amino, or amido; and monosubstituted or disubstituted cycloparaffins. The cycloparaffins used herein refer to cycloparaffins and their substitution products other than aromatic compounds.

The solid-electrolyte fuel cell fuel of the third aspect contains the liquid organic fuel, the trapping compound, and optionally a solvent. The trapping compound may be previously dissolved in the liquid organic fuel, or may be mixed with the liquid organic fuel at a point immediately anterior to the fuel electrode so that they are supplied to the fuel electrode immediately before the operation of the fuel cell.

Any solvent may be used as long as it can dissolve the liquid organic fuel and the trapping compound. In general, water or an alcohol is used.

The liquid organic fuel content in the solid-electrolyte fuel cell fuel of the third aspect is normally 5% to 90% by weight. An excessively low liquid organic fuel content reduces the fuel efficiency, and an excessively high content may cause a problem in safety.

In the solid-electrolyte fuel cell fuel of the third aspect, the trapping compound preferably has a concentration in the range of 0.001 to 1 mol/L. An excessively low concentration of the trapping compound in the solid-electrolyte fuel cell fuel cannot sufficiently produce the intended effect of reducing crossover, and an excessively high concentration is disadvantageous in cost efficiency.

Preferably, the solid-electrolyte fuel cell fuel of the third aspect has a pH of 4 to 8. By setting the pH of the solid-electrolyte fuel cell fuel at 4 to 8, negative effects on the solid electrolyte membrane and corrosion of the metal members in the fuel cell can be prevented, and thus stable operation of the fuel cell can be achieved. If the pH lies outside this range, a pH adjuster, such as an acid or an alkali, may be added as required.

A solid-electrolyte fuel cell of the present invention using the solid-electrolyte fuel cell fuel of the third aspect and a method for using the solid-electrolyte fuel cell will now be described with reference to the drawings.

Figure 4:
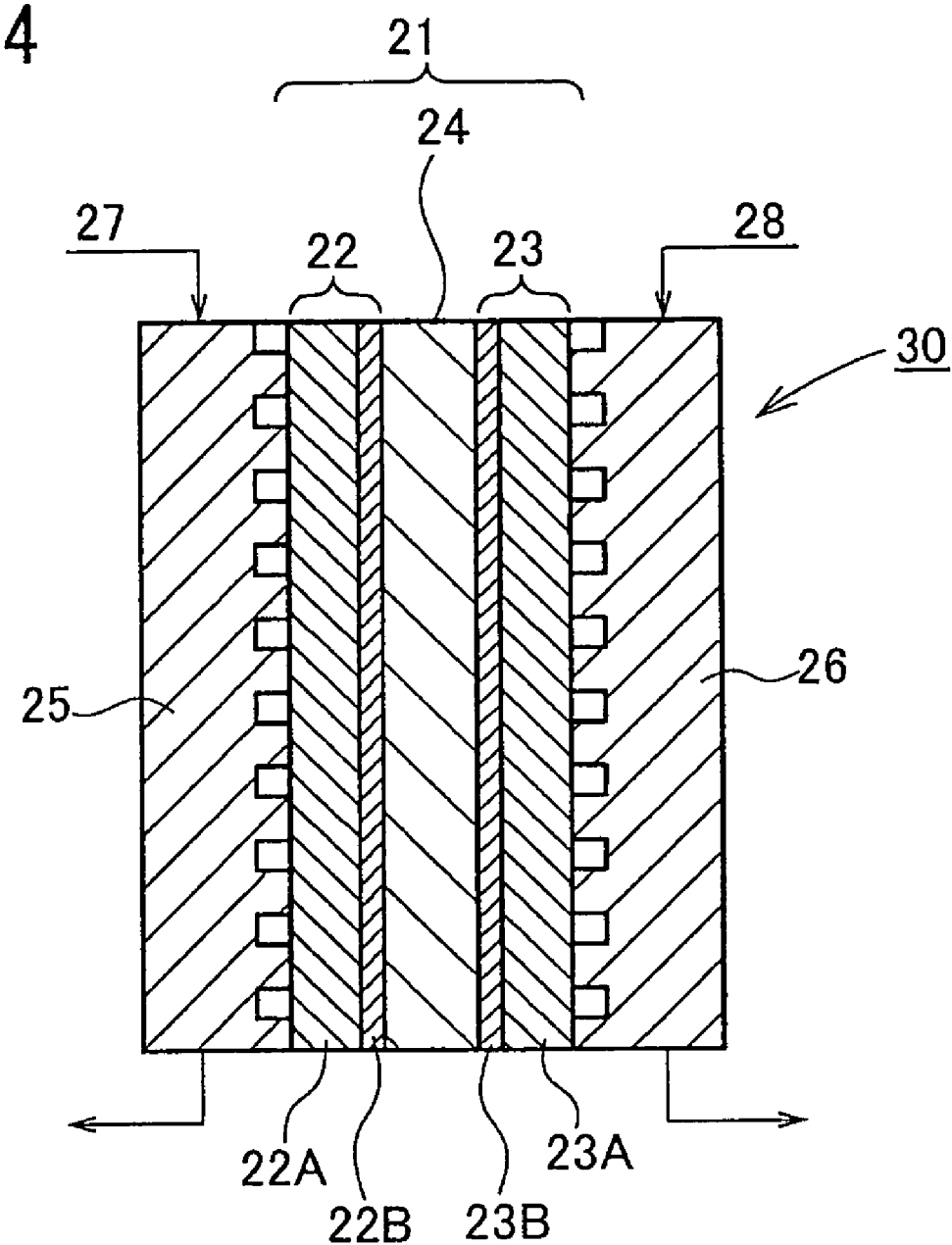
FIG. 4 is a schematic sectional view of the structure of a solid-electrolyte fuel cell according to a third aspect.

FIG. 4 is a schematic sectional view of the structure of a solid-electrolyte fuel cell according to an embodiment.

In FIG. 4, an electrode-electrolyte assembly 21 includes a fuel electrode 22, an oxidizing electrode 23, and a solid polymer electrolyte membrane 24. The fuel electrode 22 includes a base 22A and a catalyst layer 22B. The oxidizing electrode 23 includes a base 23A and a catalyst layer 23B. A plurality of electrode-electrolyte assemblies 21 are electrically connected to one another with a fuel electrode separator 25 or an oxidizing electrode separator 26 therebetween to constitute a fuel cell 30.

In this fuel cell 30, a fuel 27 is supplied to the fuel electrode 22 of each electrode-electrolyte assembly 21 through the fuel electrode separator 25. An oxidizing agent 28, such as air or oxygen, is supplied to the oxidizing electrode 23 of each electrode-electrolyte assembly 21 through the oxidizing electrode separator 26.

The solid polymer electrolyte membrane 24 separates the fuel electrode 22 from the oxidizing electrode 23 and transfers hydrogen ions between the two electrodes. Therefore the solid polymer electrolyte membrane 24 preferably has high hydrogen ion conductivity. In addition, the solid polymer electrolyte membrane 24 is preferably chemically stable and mechanically strong.

The solid polymer electrolyte membrane 24 is preferably made of an organic polymer having a polarized group, for example, a strong acid group such as sulfone, phosphoric acid, phosphone, or phosphine; or a weak acid group such as carboxyl. Such organic polymers include aromatic polymers, such as poly(4-phenoxybenzoyl-1,4-phenylene) sulfonate and polybenzoimidazole alkylsulfonates; copolymers, such as polystyrene sulfonate copolymers, polyvinylsulfonate copolymers, crosslinked alkylsulfonic acid derivatives, fluorine-containing polymers formed of a fluorocarbon skeleton and a sulfonic acid; copolymers prepared by copolymerizing an acrylamide and n-butyl methacrylate or any other acrylate, such as acrylamide-2-methylpropanesulfonic acid; sulfone group-containing perfluorocarbons, such as Nafion (registered trademark, produced by Du Pont) and Aciplex (produced by Asahi Kasei); and carboxyl group-containing perfluorocarbons, such as FLEMION (registered trademark) S (produced by Asahi Kasei). If an aromatic polymer, such as poly(4-phenoxybenzoyl-1,4-phenylene) sulfonate or a polybenzoimidazole alkylsulfonate, is used, the solid polymer electrolyte membrane 24 can suppress the permeation of the liquid organic fuel and consequently prevents the decrease in cell efficiency resulting from crossover.

The base 22A of the fuel electrode 22 and the base 23A of the oxidizing electrode 23 can be made of a porous material, such as carbon paper, carbon compact, sintered carbon, sintered metal, or foam metal, as well as the fuel electrode 22 and the oxidizing electrode 23. The bases are subjected to water-repellent treatment by, for example, use of a water repellent, such as polytetrafluoroethylene.

Examples of the catalyst of the fuel electrode 22 include platinum, rhodium, palladium, iridium, osmium, ruthenium, rhenium, gold, silver, nickel, cobalt, lithium, lanthanum, strontium, and yttrium. These catalysts may be used singly or in combination. These materials as the catalyst of the fuel electrode 22 can be used as the catalyst of the oxidizing electrode 23. The catalysts of the fuel electrode 22 and the oxidizing electrode 23 may be the same or different.

The catalyst is supported by carbon particles. Examples of the carbon particles include acetylene black such as (Denka Black (registered trademark, produced by Denki Kagaku Kogyo) and XC72 (produced by Vulcan), ketjen black, carbon nanotubes, and carbon nanohorns. The carbon particles have an average particle size of, for example, 0.01 to 0.1 µm, and preferably of 0.02 to 0.06 µm.

Any process may be applied to the preparation of the fuel electrode 22 and the oxidizing electrode 23. For example, they can be prepared in the following manner. First, the catalyst of the fuel electrode 22 and the oxidizing electrode 23 are impregnated into the carbon particles so as to be supported. Then, the carbon particles supporting the catalyst and solid polymer electrolyte particles are dispersed in a solvent to be in a paste. The paste is applied onto the bases 22A and 23A, followed by drying. Thus, the fuel electrode 22 and the oxidizing electrode 23 are prepared.

The average size of the carbon particles is set in the range of, for example, 0.01 to 0.1 µm as mentioned above. The average grain size of the catalyst is set in the range of, for example, 1 to 10 nm. The average size of the solid polymer electrolyte particles is set in the range of, for example, 0.05 to 1 µm. The carbon particles and the solid polymer electrolyte particles are used in a ratio of, for example, 2:1 to 40:1 on a weight basis. The weight ratio of the water to the solute in the paste is set at, for example, about 1:2 to 10:1.

The paste may be applied onto the base in any manner without particular limitation. For example, the paste may be applied by brush coating, spraying, or screen printing. The applied paste has a thickness of about 1 µm to 2 mm. The applied paste is heated at a temperature for a time period depending on the material, such as fluorocarbon resin, of the solid polymer electrolyte. Thus the fuel electrode 22 and the oxidizing electrode 23 are prepared. The heating temperature and heating time are set depending on the material. For example, the heating may be performed at a temperature of 100 to 250° C. for a time period of 30 second to 30 minutes.

The solid polymer electrolyte membrane 24 can be formed in an appropriate manner according to the material. For example, if an organic polymer is used for the solid polymer electrolyte membrane 24, a liquid prepared by dissolving or dispersing the organic polymer in a solvent is cast on a release sheet of, for example, polytetrafluoroethylene, followed by drying.

The resulting solid polymer electrolyte membrane 24 is sandwiched between the fuel electrode 22 and the oxidizing electrode 23 and hot-pressed to obtain the electrode-electrolyte assembly 21. In this instance, the solid polymer electrolyte membrane 24 is disposed so as to come into contact with the surfaces having the catalyst layers of the electrodes. The hot press is performed appropriate conditions set according to the material. If the solid polymer electrolyte membrane 24 and the electrolyte membranes over the surface of the electrodes are made of an organic polymer, the hot press temperature may be over the softening temperature or glass transition temperature of the polymer. More specifically, the hot press is performed, for example, at a temperature of 100 to 250° C. and a pressure of 5 to 100 kgf/cm$^2$ (0.49~9.8 MPa) for 10 to 300 seconds.

In the third aspect, the thus structured solid-electrolyte fuel cell is used such that the above-described solid-electrolyte fuel cell fuel is supplied to the fuel electrode 22 of the solid-electrolyte fuel cell. Consequently, a layer of the trapping compound for trapping the liquid organic fuel is formed between the fuel 27 in the fuel electrode 22 and the solid polymer electrolyte membrane 24, thereby preventing an excess of the liquid organic fuel from permeating the solid polymer electrolyte membrane 24 and thus reducing crossover.

In the third aspect, the solid-electrolyte fuel cell fuel of the third aspect is supplied to the fuel electrode of the solid-electrolyte fuel cell. In this instance, it is preferable that the unreacted liquid organic fuel in the fuel electrode be collected and recycled from the viewpoint of increase of the fuel efficiency.

A structure for recycling will be described below with reference to FIG. 5.

Figure 5:
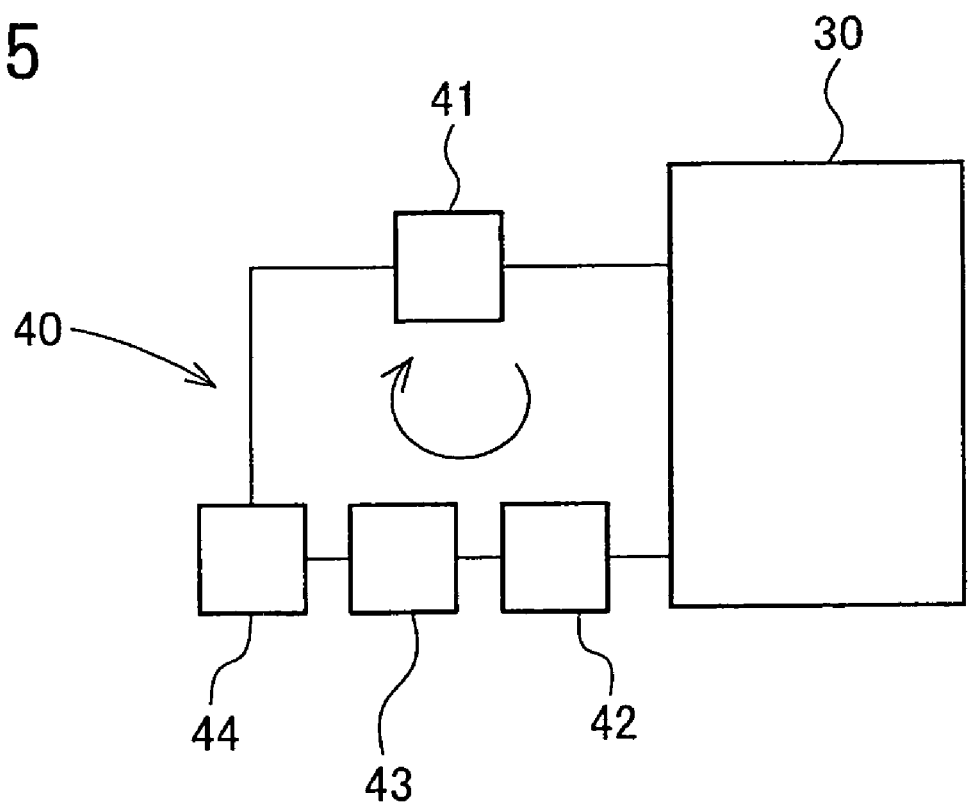
FIG. 5 is a representation of a fuel supply system for a solid-electrolyte fuel cell fuel according to the third aspect.

In FIG. 5, the fuel cell 30 is the same as in FIG. 4 and the details are not described. In the present embodiment, the structure has a fuel supply system 40 including a fuel supply portion 41 for supplying the fuel to the fuel electrode of the fuel cell 30, a fuel collecting portion 42 for collecting the used fuel discharged from the fuel electrode of the fuel cell 30, a concentration detecting portion 43 for measuring the concentrations of the liquid organic fuel and the trapping compound in the collected used fuel, and a concentration adjusting portion 44 for adjusting the concentrations of the liquid organic fuel and the trapping compound in the used liquid fuel. The fuel containing the trapping compound is circulated in the direction indicated by the arrow by liquid delivering means not shown in the figure and is thus used.

The fuel is supplied to the fuel electrode of the fuel cell 30 from the fuel supply portion 41. After passing through the fuel electrode, the fuel is collected by the fuel collecting portion 42. Products of reactions in the fuel electrode, such as carbon dioxide, are separated in the fuel collecting portion 42. Then, the collected fuel is delivered to the concentration detecting portion 43, in which the concentrations of the liquid organic fuel and the trapping compound are measured. According to the results of the measurement, the concentrations of the liquid organic fuel and the trapping compound are appropriately adjusted in the concentration adjusting portion 44, and the fuel is thus recycled. The recycled fuel is delivered to the fuel supply portion 41 and supplied to the fuel electrode of the fuel cell 30.

The fuel supply system contributes to achieving a fuel cell in which the fuel can be efficiently used.

Since the third aspect can reduce the crossover of the liquid organic fuel in the solid-electrolyte fuel cell, the solid-electrolyte fuel cell can achieve high power and high fuel efficiency.

The solid-electrolyte fuel cell of the third aspect using the solid-electrolyte fuel cell fuel of the third aspect reduces the crossover of the liquid organic fuel, and accordingly exhibits high power and favorable cell efficiency.

The solid-electrolyte fuel cell according to the third aspect includes the fuel electrode, the oxidizing electrode, and the solid electrolyte membrane held between the fuel electrode and the oxidizing electrode, and is of a type of so-called direct fuel cell, in which the liquid organic fuel is directly supplied to the fuel electrode. Although the known direct fuel cell has high cell efficiency and requires no reformer, and accordingly can be advantageously downsized, the liquid organic fuel, such as methanol, is likely to cause crossover. The third aspect can overcome the crossover and ensure favorable, stable cell efficiency over a long time.

The solid-electrolyte fuel cell of the third aspect further includes collecting means for collecting the used fuel discharged from the fuel electrode, concentration adjusting means for adjusting the concentrations of the liquid fuel and the trapping compound in the collected used fuel, and delivering means for delivering the concentration-adjusted fuel to supply means can recycle the liquid organic fuel not used in the fuel electrode. Accordingly, the liquid organic fuel can be efficiently used without waste.

The third aspect will be further described in detail with reference to the following Examples and Comparative Examples. However, the third aspect is not limited to the following Examples unless it is beyond the scope.

Example 14

Figure 6:
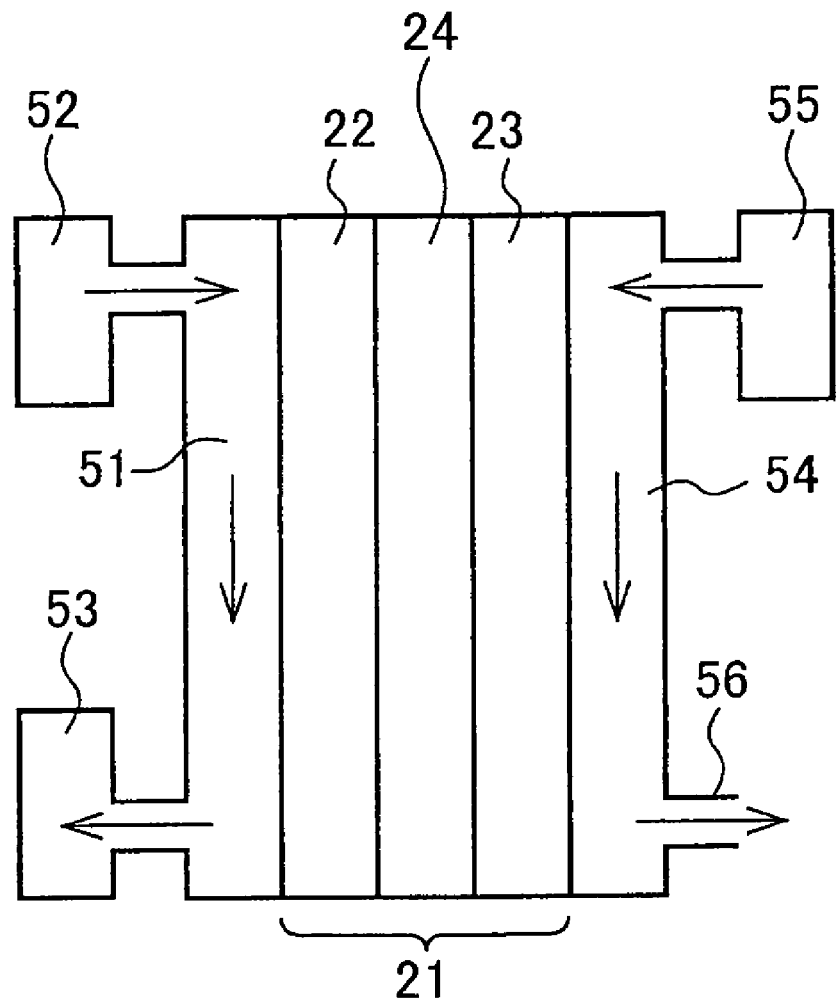
FIG. 6 is a representation of the structure of a solid-electrolyte fuel cell used in Examples 14 to 16.

The solid-electrolyte fuel cell fuel of the present Example will be described with reference to FIG. 6.

First, 10 g of acetylene black (Denka Black (registered trademark), produced by Denki Kagaku Kogyo) was mixed to 500 g of a solution of dinitrodiamine platinum in nitric acid containing 3% by weight of platinum acting as the catalyst in the fuel electrode 22 and the oxidizing electrode 23. The mixture was stirred, and 60 mL of 98% ethanol was added as a reducing agent. The mixture was stirred at about 95° C. for 8 hours so that the acetylene black particles support the platinum particles, followed by filtering and drying. Thus platinum-supporting carbon particles were prepared. The amount of supported platinum was about 50% by weight relative to the weight of the acetylene black.

Then, 200 mg of platinum-supporting carbon particles and 3.5 mL of 5% Nafion (registered trademark) solution (in alcohol, produced by Aldrich Chemical) were mixed and stirred so that the Nafion (registered trademark) was adsorbed onto the surfaces of the platinum and carbon particles. The resulting suspension was subjected to dispersion at 50° C. for 3 hours with an ultrasonic wave dispersion device to prepare a paste. The paste was applied at 2 mg/cm$^2$ onto a carbon paper (produced by Toray, TGP-H-120) by screen printing and then dried at 120° C. to prepare an electrode.

Nafion 117 (registered trademark, thickness: 150 μm) produced by Du Pont was used as the solid polymer electrolyte membrane 24. The electrodes prepared above was bonded to the solid polymer electrolyte membrane 24 by thermocompression bonding at 120° C. so that the fuel electrode 22 and the oxidizing electrode 23 sandwich the solid polymer electrolyte membrane 24, followed by hot-pressing at a temperature of 150° C., a pressure of 10 kgf/cm (0.98 MPa) for 10 seconds. Thus the electrode-electrolyte assembly 21 was prepared.

In order to supply the fuel to the fuel electrode 22, a fuel flow path 51 made of tetrafluoroethylene resin was provided to the fuel electrode 22. The fuel flow path 51 was provided with a fuel tank 52 and a waste liquid tank 53. The fuel tank 52 had a pump so that the fuel was constantly supplied to the fuel electrode 22 as indicated by the arrows.

In addition, in order to supply the oxidizing agent to the oxidizing electrode 23, an oxidizing agent flow path 54 made of tetrafluoroethylene resin was provided to the oxidizing electrode 23. The oxidizing agent flow path 54 is provided with an oxygen compressor 55 and an exhaust hole 56 so that oxygen is constantly supplied to the oxidizing electrode 23 as indicated by the arrows.

A fuel prepared by dissolving 1,1-bis(4-hydroxyphenyl) cyclohexane in 10% by weight methanol aqueous solution was placed in the fuel tank 52. The concentration of 1,1-bis (4-hydroxyphenyl)cyclohexane in the fuel was set at 0.01 mol/L. The fuel was supplied to the fuel electrode 22 at 2 mL/min, and oxygen of 1.1 atmospheres (0.11 MPa) and 25° C. was supplied to the oxidizing electrode 23 by the oxygen compressor 55.

The fuel cell was operated under these conditions to measure the current-voltage characteristics for a unit cell. The results are shown in Table 1.

Example 15

The fuel cell was operated to measure the current-voltage characteristics for a unit cell in the same manner as in Example 14, except that a fuel prepared by dissolving hydroquinone in 10% by weight methanol aqueous solution was placed in the fuel tank 52. The results are shown in Table 1. The concentration of hydroquinone in the fuel was 0.01 mol/L.

Example 16

The fuel cell was operated to measure the current-voltage characteristics for a unit cell in the same manner as in Example 14, except that a fuel prepared by dissolving bisdicyclohexylamide fumarate in 10% by weight methanol aqueous solution was placed in the fuel tank 52. The results are shown in Table 1. The concentration of bisdicyclohexylamide fumarate in the fuel was 0.01 mol/L.

Comparative Example 1

The fuel cell was operated to measure the current-voltage characteristics for a unit cell in the same manner as in Example 14, except that 10% by weight methanol aqueous solution was placed in the fuel tank 22. The results are shown in Table 1.

TABLE 1

|  | Trapping compound | Open-circuit voltage (V) | Short-circuit current (mA/cm$^2$) | Maximum power (mW/cm$^2$) |
| --- | --- | --- | --- | --- |
| Example 14 | 1,1-bis(4-hydroxyphenyl)cyclohexane | 0.65 | 270 | 48 |
| Example 15 | hydroquinone | 0.66 | 340 | 55 |
| Example 16 | bisdicyclohexylamide fumarate | 0.65 | 280 | 49 |
| Comparative Example 1 | — | 0.60 | 210 | 35 |

Table 1 clearly shows that the unit cells of Examples 14 to 16 exhibited superior open-circuit voltage, short-circuit current, and maximum power to the unit cell of Comparative Example 1.

[4] A method for releasing a fuel from a fuel cell fuel composition according to the fourth aspect will now be described.

The method for releasing a fuel from a fuel cell fuel composition according to the fourth aspect is intended to release a fuel cell fuel from a fuel cell fuel composition containing the fuel, and in which the fuel is released to water by bringing the fuel composition into contact with water.

The fuel cell used in the fourth aspect is not particularly limited, but is preferably a type of solid polymer electrolyte fuel cell and is, for example, a direct methanol fuel cell.

Any fuel for fuel cells can be used as the fuel cell fuel according to the fourth aspect. Exemplary fuel cell fuels include, but not limited to, hydrogen, alcohols, ethers, hydrocarbons, and acetals. More specifically, fuel materials include hydrogen; alcohols, such as methanol, ethanol, n-propanol, isopropanol, and ethylene glycol; ethers, such as dimethyl ether, methyl ethyl ether, and diethyl ether; hydrocarbons, such as propane and butane; and acetals, such as dimethoxymethane and trimethoxymethane. These fuel cell fuels may be used singly or in combination.

The fuel cell fuel composition according to the fourth aspect may be in, but not limited to, a form of: [1] a molecular compound containing the fuel cell fuel; or [2] a polymer that has absorbed the fuel cell fuel.

First, the representative forms [1] and [2] of the fuel composition containing the fuel cell fuel according to the fourth aspect will be described.

[1] Molecular Compound Formed of the Fuel Cell Fuel and its Counterpart Compound The molecular compound used herein refers to a compound prepared from at least two solely stable compounds with a bond other than the covalent bond, formed by a relatively weak interaction, such as a hydrogen bond or a Van der Waals force. Such molecular compounds include hydrates, solvated compounds, addition compounds, and inclusion compounds. The molecular compound can be prepared by a contact catalytic reaction of a counterpart compound for forming the molecular compound with the fuel cell fuel. The molecular compound, for example, allows a gaseous or liquid fuel cell fuel to be in a solid compound to store the fuel cell fuel stably in a relatively lightweight form.

One example of such a molecular compound according to the fourth aspect is an inclusion compound enclosing the fuel cell fuel, formed by a contact catalytic reaction of a host compound with the fuel cell fuel.

The host compounds forming the inclusion compound enclosing the fuel cell fuel may be an organic compound, an inorganic compound, or an organic-inorganic complex compound. Organic host compounds include monomolecular, multimolecular, and polymeric hosts.

Exemplary monomolecular host compounds include cyclodextrins, crown ethers, cryptands, cyclophanes, azacyclophanes, calixarenes, cyclotriveratrylenes, spherands, and cyclic oligopeptides. Exemplary multimolecular host compounds include ureas, thioureas, deoxycholic acids, perhydrotriphenylenes, tri-o-thymotides, bianthryls, spirobifluorenes, cyclophosphazenes, monoalcohols, diols, acetylene alcohols, hydroxybenzophenones, phenols, bisphenols, trisphenols, tetrakisphenols, polyphenols, naphthols, bisnaphthols, diphenylmethanols, carboxylic amides, thioamides, bixanthenes, carboxylic acids, imidazoles, and hydroquinones. Exemplary polymeric host compounds include celluloses, starches, chitins, chitosans, polyvinyl alcohols, polyethylene glycol arm polymers having 1,1,2,2-tetrakisphenylethane as the core, and polyethylene glycol arm polymers having α,α,α',α'-tetrakisphenylxylene as the core.

In addition, organic host compounds further include organophosphorus compounds and organosilicon compounds.

Exemplary inorganic host compounds include titanium oxide, graphite, alumina, transition-metal dichalcogenite, lanthanum fluoride, clay minerals (montmorillonite, etc.), silver salts, silicates, phosphates, zeolite, silica, and porous glass.

Some organic metal compounds have the nature of the host compound. Such organic metal compounds include organoaluminum compounds, organotitanium compounds, organoboron compounds, organozinc compounds, organoindium compounds, organogallium compounds, organotellurium compounds, organotin compounds, organozirconium compounds, and organomagnesium compound. Metal salts of organic carboxylic acids and organic metal complexes may be used as the host compound. The organic metal host compound is not particularly limited to these compounds.

Among these host compounds, preferred are multimolecular host compounds, whose inclusion ability does not easily depend on the molecular size of the guest compound.

Exemplary multimolecular host compounds include urea, 1,1,6,6-tetraphenylhexa-2,4-diyne-1,6-diol, 1,1-bis(2,4-dimethylphenyl)-2-propyne-1-ol, 1,1,4,4-tetraphenyl-2-butyne-1,4-diol, 1,1,6,6-tetrakis(2,4-dimethylphenyl)-2,4-hexadiyne-1,6-diol, 9,10-diphenyl-9,10-dihydroanthracene-9,10-diol, 9,10-bis(4-methylphenyl)-9,10-dihydroanthracene-9,10-diol, 1,1,2,2-tetraphenylethane-1,2-diol, 4-methoxyphenol, 2,4-dihydroxybenzophenone, 4,4'-dihydroxybenzophenone, 2,2'-dihydroxybenzophenone, 2,2',4,4'-tetrahydroxybenzophenone, 1,1-bis(4-hydroxyphenyl)cyclohexane, 4,4'-sulfonylbisphenol, 2,2'-methylenebis(4-methyl-6-t-butylphenol), 4,4'-ethylidenebisphenol, 4,4'-thiobis(3-methyl-6-t-butylphenol), 1,1,3-tris(2-methyl-4-hydroxy-5-t-butylphenyl)butane, 1,1,2,2-tetrakis(4-hydroxyphenyl)ethane, 1,1,2,2-tetrakis(4-hydroxyphenyl)ethylene, 1,1,2,2-tetrakis(3-methyl-4-hydroxyphenyl)ethane, 1,1,2,2-tetrakis(3-fluoro-4-hydroxyphenyl)ethane, α,α,α',α'-tetrakis(4-hydroxyphenyl)-p-xylene, tetrakis(p-methoxyphenyl)ethylene, 3,6,3',6'-tetramethoxy-9,9'-bi-9H-xanthene, 3,6,3',6'-tetraacetoxy-9,9'-bi-9H-xanthene, 3,6,3',6'-tetrahydroxy-9,9'-bi-9H-xanthene, gallic acid, methyl gallate, catechin, bis-p-naphthol, α,α,α',α'-tetraphenyl-1,1'-biphenyl-2,2'-dimethanol, bisdicyclohexylamide diphenate, bisdicyclohexylamide fumarate, cholic acid, deoxycholic acid, 1,1,2,2-tetraphenylethane, tetrakis(p-iodophenyl)ethylene, 9,9'-bianthryl, 1,1,2,2-tetrakis(4-carboxyphenyl)ethane, 1,1,2,2-tetrakis(3-carboxyphenyl)ethane, acetylenedicarboxylic acid, 2,4,5-triphenylimidazole, 1,2,4,5-tetraphenylimidazole, 2-phenylphenanthro[9,10-d]imidazole, 2-(o-cyanophenyl)phenanthro[9,10-d]imidazole, 2-(m-cyanophenyl)phenanthro[9,10-d]imidazole, 2-(p-cyanophenyl)phenanthro[9,10-d]imidazole, hydroquinone, 2-t-butylhydroquinone, 2,5-di-t-butylhydroquinone, and 2,5-bis(2,4-dimethylphenyl)hydroquinone.

Among these host compounds, advantageous in inclusion ability are phenolic host compounds, such as 1,1-bis(4-hydroxyphenyl)cyclohexane, 1,1,2,2-tetrakis(4-hydroxyphenyl)ethane, and 1,1,2,2-tetrakis(4-hydroxyphenyl)ethylene; amidic host compounds, such as bis(dicyclohexylamide) diphenate, and bisdicyclohexylamide fumarate; and imidazolic host compounds, such as 2-(m-cyanophenyl)phenanthro[9,10-d]imidazole. In particular, phenolic host compounds such as 1,1-bis(4-hydroxyphenyl)cyclohexane are advantageous because they are easy to use in industrial applications.

These host compounds may be used singly or in combination.

The host compound may be in any form as long as it can form a solid inclusion compound with the fuel cell fuel.

Among the host compounds, organic host compounds may be supported in an inorganic porous material and thus used in a form of organic-inorganic complex. In this instance, porous materials for supporting the organic host compound include, but not limited to, silica, zeolite, activated carbon, clay minerals, and intercalation complexes such as montmorillonites. In order to prepare the organic-inorganic complex, for example, the organic host compound is dissolved in a solvent, and the solution is impregnated into a porous material, followed by, for example, drying the solvent or drying under reduced pressure. The amount of organic host compound supported in the porous material is not particularly limited, but is generally about 10% to 80% by weight relative to the amount of the porous material.

In order to synthesize the inclusion compound with the fuel cell fuel using the host compound, such as 1,1-bis(4-hydroxyphenyl)cyclohexane, the fuel cell fuel and the host compound may be brought into direct contact and mixed with each other. Thus, the inclusion compound enclosing the fuel cell fuel can be easily synthesized. For synthesis of the inclusion compound, alternatively, the host compound may be dissolved in the fuel cell fuel with heating and recrystallized. As long as the fuel cell fuel is in a gas or liquid form, the fuel can be enclosed in an inclusion compound by coming into contact with the host compound while being pressurized.

The temperature at which the fuel cell fuel and the host compound are brought into contact for the synthesis of the inclusion compound is not particularly limited, but it is preferably between room temperature and about 100° C. The pressure at this point is not also particularly limited. How long the fuel cell fuel and the host compound are in contact with each other is not particularly limited, but preferably about 0.01 to 24 hours from the viewpoint of working efficiency.

The fuel cell fuel to be brought into contact with the host compound preferably has a high purity. However, if the host compound has an ability to selectively enclose the fuel cell fuel, the fuel cell fuel may be in a form of a liquid mixture containing any other constituent.

The thus prepared inclusion compound generally encloses 0.1 to 10 mol of molecules of the fuel cell fuel relative to 1 mol of the host compound, depending on the type of the host compound used, conditions for contact with the fuel cell fuel, and the like.

The resulting inclusion compound allows the fuel cell fuel to be stably stored under conditions of room temperature and normal pressure over a long time. The inclusion compound is lightweight and easy to handle, and is generally in a solid form. Accordingly, the inclusion compound can be stored in a container, such as of glass, metal, or plastic, and thus the problem of leakage can be overcome. In addition, by enclosing the fuel cell fuel, which is normally gas or liquid, to turn it solid, its deleterious or hazardous nature can be hidden. Furthermore, the chemical reactivity of the fuel cell fuel can be reduced. For example, the corrosiveness to metals can be alleviated.

The host compound after releasing the fuel cell fuel from the inclusion compound by the method described below has an ability to selectively enclose the fuel cell fuel and can be advantageously recycled for enclosing the fuel cell fuel.

[2] Fuel Composition being a Polymer that has Absorbed the Fuel Cell Fuel

The fuel composition is prepared by impregnating a liquid fuel cell fuel (hereinafter referred to "liquid fuel") into a crosslinked product (A) of the following polymer compound (1).

Polymer Compound (1): polymer or copolymer of a constitutional unit (hereinafter referred to as the "acidic group-containing constitutional unit (a)") having a carboxyl group and/or a sulfonic group in the molecule, prepared by substituting an onium cation for 30% to 100% by mole of proton of the carboxyl group and/or the sulfonic group of Polymer Compound (2) that contains 20% to 100% by weight of the acidic group-containing constitutional unit (a).

In the fourth aspect, as described below, Polymer Compound (1) is not limited to compounds prepared by substituting an onium cation for a predetermined amount of proton of the carboxyl group and/or the sulfonic group of Polymer Compound (2), and may be a compound prepared by previously substituting an onium cation for the proton of the carboxyl group and/or the sulfonic group of the acidic group-containing constitutional unit (a) and subsequently polymerizing or copolymerizing the substituted constitutional unit (a). The crosslinked products (A) of the Polymer Compound (1) is not limited to compounds prepared by crosslinking a previously produced Polymer Compound (1), and may be a compound prepared by crosslinking in the course of the production of Polymer Compound (2) or Polymer Compound (1), as long as a crosslinked product of Polymer Compound (1) can be produced. The introduction of an onium cation and crosslinking may be performed through at least two steps.

Examples of the acidic group-containing constitutional unit (a) forming Polymer Compound (2) include:

monomers containing a carboxyl group, such as (meth) acrylic acid, ethacrynic acid, crotonic acid, sorbic acid, maleic acid, itaconic acid, fumaric acid, cinnamic acid, and their anhydrides; and monomers containing a sulfonic group, such as aliphatic vinylsulfonic acid monomers [vinylsulfonic acid, allylsulfonic acid, vinyltoluenesulfonic acid, styrenesulfonic acid, etc.], (meth)acrylate sulfonic acids [sulfoethyl (meth)acrylate, sulfopropyl (meth)acrylate, etc.], and (meth)acrylamide sulfonic acid monomers [acrylamide-2-methylpropanesulfonic acid, etc. Preferably, the acidic group-containing constitutional unit (a) has a carbon number of 3 to 30.

Polymer Compound (2) may contain the acidic group-containing constitutional unit (a) singly or in combination. The Polymer Compound (2) may further contain another constitutional unit (hereinafter referred to as "additional constitutional unit (b)") capable of copolymerizing with the acidic group-containing constitutional unit (a).

Examples of the additional constitutional unit (b) include:

alkyl (meth)acrylate esters (alkyl carbon number: 1 to 30), such as methyl (meth)acrylate, ethyl (meth)acrylate, propyl (meth)acrylate, butyl (meth)acrylate, ethylhexyl (meth)acrylate, octyl (meth)acrylate, dodecyl (meth)acrylate, stearyl (meth)acrylate, phenyl (math)acrylate, octylphenyl (meth) acrylate, and cyclohexyl (meth)acrylate;

oxyalkyl (meth)acrylates (alkyl carbon number: 1 to 4), such as hydroxyethyl (meth)acrylate, hydroxypropyl (meth) acrylate, polyethylene glycol mono(meth)acrylate ester (PEG number average molecular weight: 100 to 4,000), polypropylene glycol mono(meth)acrylate ester (PPG number average molecular weight: 100 to 4,000), monomethoxypolyethylene glycol (meth)acrylate (PEG number average molecular weight: 100 to 4,000), and monomethoxypropylene glycol (meth)acrylate (PPG number average molecular weight: 100 to 4,000);

(meth)acrylamides, such as (meth)acrylamide, (di)methyl (meth)acrylamide, (di)ethyl(meth)acrylamide, and (di)propyl(meth)acrylamide;

allyl ethers, such as methylallyl ether, ethyl allyl ether, propyl allyl ether, glycerol monoallyl ether, trimethylolpropane triallyl ether, and pentaerythritol monoallyl ether;

α-olefins having carbon numbers of 4 to 20, such as isobutylene, 1-hexene, 1-octene, isooctene, 1-nonene, 1-decene, and 1-dodecene;

aromatic vinyl compounds having carbon numbers of 8 to 20, such as styrene, t-butylstyrene, and octylstyrene;

other vinyl compounds, such as N-vinylacetamide, vinyl caproate, vinyl laurate, and vinyl stearate;

amino group-containing monomers, such as dialkylaminoethyl (meth)acrylate (alkyl carbon number: 1 to 5), and meth (acryloyl)oxyethyltrialkyl ammonium chlorides, bromides and sulfates (alkyl carbon number: 1 to 5); and alkali metal salts of the above-listed monomers containing a carboxyl or sulfonic group, such as their primary to tertiary amine salts and alkanolamine salts. Including other additional constitutional units (b), the Polymer Compound (2) may contain those additional constitutional units (b) singly or in combination.

The content of the acidic group-containing constitutional unit (a) in polymer compound (2) is generally 20% to 100% by weight, preferably 40% to 100% by weight, and more preferably 60% to 100% by weight. If the content of the acidic group-containing constitutional unit (a) in polymer compound (2) is lower than 20%, the absorbed amount of the liquid fuel is reduced even if the below described onium cation is substituted for the proton of the carboxyl or sulfonic group. Also, such a low content may not help the liquid fuel gelate.

If Polymer Compound (2) contains the additional constitutional unit (b), alkyl (meth)acrylate esters, oxyalkyl (meth) acrylates, allyl ethers, α-olefins, aromatic vinyl compounds are preferably selected from the above-listed constitutional units, from the viewpoint of ease of polymerization of the monomer and stability of the resulting polymer.

In order to efficiently absorb or gelate the liquid fuel, it is preferable that the difference in SP value (solubility parameter) between the additional constitutional unit (b) and the liquid fuel be 5 or less from the viewpoint of increase of the absorption and gelation. More preferably, the difference in SP value between the liquid fuel to be absorbed and the additional constitutional unit (b) is 3 or less.

Polymer Compound (2) can be prepared by any method without particular limitation as long as a Polymer Compound (2) containing a predetermined amount of acidic group-containing constitutional unit (a) can be produced. In addition to the method of polymerizing a predetermined amount of acidic group-containing constitutional unit (a), Polymer Compound (2) can be prepared by, for example, a method in which a monomer capable of easy conversion into a carboxyl or sulfonic group, such as an ester or amide of a carboxyl or sulfonic group-containing monomer, is polymerized and a predetermined amount of constitutional unit with the carboxyl or sulfonic group is introduced into the molecule by hydrolysis or the like. Another method may be applied of graft-copolymerizing a carboxyl or sulfonic group-containing polysaccharide polymer represented by carboxymethyl cellulose, or the polysaccharide and another monomer.

Polymer Compound (1) is prepared by substituting an onium cation for 30% to 100% by mole of proton of the carboxyl and/or the sulfonic group of Polymer Compound (2).

The onium cation is at least one cation selected from the group consisting of quaternary ammonium cations (I), tertiary phosphonium cations (II), quaternary phosphonium cations (III), and tertiary oxonium cations (IV).

The quaternary ammonium cations (I) include the following (I-1) to (I-11).

(I-1): Aliphatic quaternary ammonium ions containing an alkyl and/or an alkenyl group having a carbon number of 4 to 30 or more, such as tetramethyl ammonium, ethyltrimethyl ammonium, diethyldimethyl ammonium, triethylmethyl ammonium, tetraethyl ammonium, trimethylpropyl ammonium, tetrapropyl ammonium, butyltrimethyl ammonium, and tetrabutyl ammonium.

(I-2): Aromatic quaternary ammonium cations having carbon numbers of 6 to 30 or more, such as trimethylphenyl ammonium, dimethylethylphenyl ammonium, and triethylphenyl ammonium.

(I-3): Alicyclic quaternary ammonium ions having carbon numbers of 3 to 30 or more, such as N,N-dimethylpyrrolidinium, N-ethyl-N-methylpyrrolidinium, N,N dimethylmorpholinium, N,N diethylmorpholinium, N,N dimethylpiperidinium, and N,N-diethylpiperidinium.

(I-4): Imidazolinium ions having carbon numbers of 3 to 30 or more, such as 1,2,3-trimethylimidazolinium, 1,2,3,4-tetramethylimidazolinium, 1,3,4-trimethyl-2-ethylimidazolinium, 1,2-dimethyl-3,4-diethylimidazolinium, 1,2-dimethyl-3-ethylimidazolinium, 1-ethyl-3-methylimidazolinium, 1,2,3,4-tetraethylimidazolinium, 1,2,3-triethylimidazolinium, 4-cyano-1,2,3-trimethylimidazolinium, 2-cyanomethyl-1,3-dimethylimidazolinium, 4-acetyl-1,2,3-trimethylimidazolinium, 4-methylcarboxymethyl-1,2,3-trimethylimidazolinium, 4-formyl-1,2,3-trimethylimidazolinium, 3-hydroxyethyl-1,2,3-trimethylimidazolinium, and 3-hydroxyethyl-1,2-dimethylimidazolinium.

(I-5): Imidazoliums having carbon numbers of 3 to 30 or more, such as 1,3-dimethylimidazolium, 1-ethyl-3-methylimidazolium, 1-methyl-3-ethylimidazolium, 1,2,3,4-tetramethylimidazolium, 1,2-dimethyl-3-ethylimidazolium, 1-ethyl-3-methylimidazolium, 1-methyl-3-ethylimidazolium, 1,2,3-triethylimidazolium, 1,2,3,4-tetraethylimidazolium, 1,3-dimethyl-2-phenylimidazolium, 1,3-dimethyl-2-benzylimidazolium, 4-cyano-1,2,3-trimethylimidazolium, 3-cyanomethyl-1,2-dimethylimidazolium, 4-acetyl-1,2,3-trimethylimidazolium, 4-methoxy-1,2,3-trimethylimidazolium, 3-formylmethyl-1,2-dimethylimidazolium, 2-hydroxyethyl-1,3-dimethylimidazolium, N,N'-dimethylbenzoimidazolium, N,N'-diethylbenzoimidazolium, and N-methyl-N'-ethylbenzoimidazolium.

(I-6): Tetrahydropyrimidinium ions having carbon numbers of 4 to 30 or more, such as 1,3-dimethyltetrahydropyrimidinium, 1,2,3-trimethyltetrahydropyrimidinium, 1,2,3,4-tetramethyltetrahydropyridinium, 8-methyl-1,8-diazabicyclo[5,4,0]-7-undecenium, 5-methyl-1,5-diazabicyclo[4,3,0]-5-nonenium, 3-cyanomethyl-1,2-dimethyltetrahydropyrimidinium, 3-acetyl methyl-1,2-dimethyl tetrahydropyrimidinium, 4-methylcarboxymethyl-1,2,3-trimethyl-tetrahydropyrimidinium, 3-methoxymethyl-1,2-dimethyltetrahydropyrimidinium, and 4-hydroxymethyl-1,3-dimethyltetrahydropyrimidinium.

(I-7): Dihydropyrimidiniums having carbon numbers of 4 to 30 ore more, such as 1,3-dimethyl-2,4- or -2,6-dihydropyrimidinium (hereinafter expressed as 1,3-dimethyl-2,4,(6)-dihydropyrimidinium, and similar expressions being applied to similar), 1,2,3-trimethyl-2,4,(6)-dihydropyrimidinium, 1,2,3,4-tetramethyl-2,4,(6)-dihydropyrimidinium, 1,2,3,5-tetramethyl-2,4,(6)-dihydropymidinium, 8-methyl-1,8-diazacyclo[5,4,0]-7,9(10)-undecanedienium, 2-cyanomethyl-1,3-dimethyl-2,4,(6)-dihydropyrimidinium, 3-acetylmethyl-1,2-dimethyl-2,4,(6)-dihydropyrimidinium, 4-methylcarboxymethyl-1,2,3-trimethyl-2,4,(6)-dihydropyrimidinium, 4-formyl-1,2,3-trimethyl-2,4,(6)-dihydropyrimidinium, and 3-hydroxyethyl-1,2-dimethyl-2,4,(6)-dihydropyrimidinium.

(I-8): Guanidiums having imidazolinium skeletons and having carbon numbers of 3 to 30 or more, such as 2-dimethylamino-1,3,4-trimethylimidazolinium, 2-diethylamino-1,3,4-trimethylimidazolinium, 2-dimethylamino-1-methyl-3,4-diethylimidazolinium, 2-dimethylamino-1,3-dimethylimidazolinium, 2-diethylamino-1,3-dimethylimidazolinium, 2-diethylamino-1,3-diethylimidazolinium, 1,5,6,7-tetrahydro 1,2-dimethyl-2H-pyrimido[1,2a]imidazolinium, 1,5-dihydro-1,2-dimethyl-2H-pyrimido[1,2a]imidazolinium, 2-dimethylamino-3-methylcarboxymethyl-1-methylimidazolinium, 2-dimethylamino-3-methoxymethyl-1-methylimidazolinium, 2-dimethylamino-3-hydroxyethyl-1-methylimidazolinium, and 2-dimethylamino-4-hydroxymethyl-1,3-dimethylimidazolinium.

(I-9): Guanidiums having imidazolium skeletons and having carbon numbers of 3 to 30 or more, such as 2-dimethylamino-1,3,4-trimethylimidazolium, 2-diethylamino-1,3,4-trimethylimidazolium, 2-diethylamino-1,3-dimethyl-4-ethylimidazolium, 2-diethylamino-1,3,4-triethylimidazolium, 2-dimethylamino-1,3-dimethylimidazolium, 1,5,6,7-tetrahydro-1,2-dimethyl-2H-imido[1,2a]imidazolium, 1,5-dihydro-1,2-dimethyl-2H-pyrimido-[1,2a]imidazolium, 2-dimethylamino-3-cyanomethyl-1-methylimidazolium, 2-dimethylamino-4-methylcarboxymethyl-1,3-dimethylimidazolium, 2-dimethylamino-3-methoxymethyl-1-methylimidazolium, 2-dimethylamino-3-formylmethyl-1-methylimidazolium, and 2-dimethylamino-4-hydroxymethyl-1,3-dimethylimidazolium.

(I-10): Guanidiums having tetrahydropyrimidinium skeletons and having carbon numbers of 4 to 30 or more, such as 2-dimethylamino-1,3,4-trimethyltetrahydropyrimidinium, 2-diethylamino-1,3,4-trimethyltetrahydropyrimidinium, 2-dimethylamino-1,3-dimethyltetrahydropyrimidinium, 2-diethylamino-1,3-dimethyltetrahydropyrimidinium, 1,3,4,6,7,8-hexahydro-1,2-dimethyl-2H-imido[1,2a]pyrimidinium, 1,3,4,6,7,8-hexahydro-1,2-dimethyl-2H-pyrimido[1,2a]pyrimidinium, 2-dimethylamino-3-cyanomethyl-1-methyltetrahydropyrimidinium, 2-dimethylamino-4-acetyl-1,3-dimethyltetrahydropyrimidinium 2-dimethylamino-4-methylcarboxyethyl-1,3-dimethyltetrahydropyrimidinium, 2-dimethylamino-3-methoxymethyl-1-methyltetrahydropyrimidinium, 2-dimethylamino-3-hydroxyethyl-1-methyltetrahydropyrimidinium, and 2-dimethylamino-4-hydroxymethyl-1,3-dimethyltetrahydropyrimidinium.

(I-11): Guanidiums having dihydropyrimidinium skeletons and having carbon numbers of 4 to 30 or more, such as 2-dimethylamino-1,3,4-trimethyl-2,4(6)-dihydropyrimidinium, 2-diethylamino-1,3,4-trimethyl-2,4(6)-dihydropyrimidinium, 2-diethylamino-1,3,4-triethyl-2,4(6)-dihydropyrimidinium, 2-diethylamino-1,3-dimethyl-2,4(6)-dihydropyrimidinium, 2-dimethylamino-1-ethyl-3-methyl-2,4(6)-dihydropyrimidinium, 1,6,7,8-tetrahydro-1,2-dimethyl-2H-imido[1,2a]pyrimidinium, 1,6-dihydro-1,2-dimethyl-2H-pyrimido[1,2a]pyrimidinium, 2-dimethylamino-4-cyano-1,3-dimethyl-2,4(6)-dihydropyrimidinium, 2-dimethylamino-3-acetylmethyl-1-methyl-2,4(6)-dihydropyrimidinium, 2-dimethylamino-3-methylcarboxymethyl-1-methyl-2,4(6)-dihydropyrimidinium, 2-dimethylamino-4-formyl-1,3-dimethyl-2,4(6)-dihydropyrimidinium, and 2-dimethylamino-3-formylmethyl-1-methyl-2,4(6)-dihydropyrimidinium.

The tertiary phosphonium cations (II) include the following (II-1) to (II-3).

(II-1): Aliphatic tertiary phosphoniums having alkyl and/or alkenyl groups and having carbon numbers of 1 to 30 or more, such as trimethylsulfonium, triethylsulfonium, ethyldimethylsulfonium, and diethylmethylsulfonium.

(II-2): Aromatic tertiary phosphoniums having carbon numbers of 6 to 30 or more, such as phenyldimethylsulfonium, phenylethylmethylsulfonium, and phenylmethylbenzylsulfonium.

(II-3): Alicyclic tertiary phosphoniums having carbon numbers of 3 to 30 or more, such as methylthiolanium, phenylthiolanium, and methylthianium.

The quaternary phosphonium cations (III) include the following (III-1) to (III-3).

(III-1): Aliphatic quaternary phosphoniums having alkyl and/or alkenyl groups and having carbon numbers of 1 to 30 or more, such as tetramethylphosphonium, tetraethylphosphonium, tetrapropylphosphonium, tetrabutylphosphonium, methyltriethylphosphonium, methyltripropylphosphonium, methyltributylphosphonium, dimethyldiethylphosphonium, dimethyldibutylphosphonium, trimethylethylphosphonium, trimethylpropylphosphonium, and trimethylbutylphosphonium.

(III-2): Aromatic quaternary phosphoniums having carbon numbers of 6 to 30 or more, such as triphenylmethylphosphonium, diphenyldimethylphosphonium, and triphenylbenzylphosphonium.

(III-3): Alicyclic quaternary phosphoniums having carbon numbers of 3 to 30 or more, such as 1,1-dimethylphospholanium, 1-methyl-1-ethylphospholanium, 1,1-diethylphospholanium, 1,1-diethylphosphorinanium, and 1,1-pentaethylenephosphorinanium.

The tertiary oxonium cations (IV) include the following (IV-1) to (IV-3).

(IV-1): Aliphatic tertiary oxoniums having alkyl and/or alkenyl groups and having carbon numbers of 1 to 30 or more, such as trimethyloxonium, triethyloxonium, ethyldimethyloxonium, and diethylmethyloxonium.

(IV-2): Aromatic tertiary oxoniums having carbon numbers of 6 to 30 or more, such as phenyldimethyloxonium, phenylethylmethyloxonium, and phenylmethylbenzyloxonium.

(IV-3): Alicyclic tertiary oxoniums having carbon numbers of 3 to 30 or more, such as methyloxolanium, phenyloxolanium, and methyloxanium.

Among these onium cations, preferred are quaternary ammonium cations (I); more preferred are (I-1), (I-4), and (I-5); and particularly preferred are (I-4) and (I-5).

These onium cations may be used singly or in combination.

Any method can be applied for substituting the onium cation for the proton of the carboxyl and/or the sulfonic group of Polymer Compound (2) as long as the method can substitute the onium cation for a predetermined amount of proton. For example, the substitution can be easily performed by adding a hydroxide salt (for example, tetraethylammonium hydroxide) or a monomethylcarbonate (for example, 1,2,3,4-trimethylimidazolinium monomethylcarbonate) of the onium cation to the Polymer Compound (2), and then optionally performing dehydration, decarboxylation, or demethanolization. Alternatively, the same substitution may be performed in a stage of a monomer constituting the Polymer Compound (2).

In order to prepare Polymer Compound (1) by substitution of an onium cation, for example, the onium cation may be substituted for the proton of the carboxyl and/or the sulfonic group of the acidic group-containing constitutional unit (a), followed by polymerization or copolymerization, or the onium cation may be substituted for the proton of the carboxyl and/or the sulfonic group of Polymer Compound (2). The substitution of the onium cation for the proton of the carboxyl and/or the sulfonic group of the acidic group-containing constitutional unit (a) can be in any stage, as long as a polymer compound (1) having a predetermined amount of onium cation can be prepared.

The ratio of the proton of the carboxyl and/or the sulfonic group of Polymer Compound (2) replaced with the onium cation (hereinafter referred to as "onium cation-substituted ratio") is generally 30% to 100% by mole, preferably 50% to 100% by mole, and still preferably 70% to 100% by mole. If the onium cation-substituted ratio is less than 30% by mole, the dissociations of the carboxyl or the sulfonic group and the onium cation of Polymer Compound (1) may become too low to ensure sufficient swelling or gelation.

In the process step of the preparation of Polymer Compound (2) or Polymer Compound (1), or a subsequent step, crosslinking is performed to produce the crosslinked product (A) of Polymer Compound (1) by a known method. For example, the following (1) to (5) may be applied.

(1) Crosslinking with Copolymerizable Crosslinking Agent:

A copolymerizable crosslinking agent is copolymerized with raw material constituents to form crosslinks before or during the synthesis of Polymer Compound (2). The crosslinking agent is copolymerizable with at least one of the raw material constituents including the acidic group-containing constitutional unit (a) being the raw material of Polymer Compound (2) and/or the onium cation substitution product of the acidic group-containing constitutional unit (a) and optionally an additional constitutional unit (b), or has at least two double bonds in the molecule. Examples of the copolymerizable crosslinking agent include polyvalent vinyl crosslinking agents, such as divinylbenzene; (meth)acrylamide crosslinking agents, such as N,N'-methylenebisacrylamide; polyvalent allyl ether crosslinking agents, such as pentaerythritol triallyl ether; and polyvalent (meth)acrylic ester crosslinking agents, such as trimethylolpropane triacrylate.

(2) Crosslinking with Reactive Crosslinking Agent:

Crosslinking is performed before or during the synthesis of Polymer Compound (2) using a reactive crosslinking agent having at least two functional groups reactive with a functional group or the like of the raw material constituents. Examples of the reactive crosslinking agent include polyvalent isocyanate crosslinking agents, such as 4,4'-diphenylmethane diisocyanate; polyvalent epoxy crosslinking agents, such as polyglycerol polyglycidyl ether; polyhydric alcohol crosslinking agents, such as glycerin; polyvalent amine or imine crosslinking agents, such as hexamethylenetetramine and polyethyleneimine; haloepoxy crosslinking agents, such as epichlorohydrin; and polyvalent metal salt crosslinking agents, such as aluminum sulfate.

(3) Crosslinking with Polymerizable Reactive Crosslinking Agent:

Crosslinking is performed before or during the synthesis of Polymer Compound (2) using a polymerizable reactive crosslinking agent polymerizable with the raw material constituents, or having an double bond and a functional group reactive with a functional group of the raw material constituents in the molecule. Examples of the polymerizable reactive crosslinking agent include glycidyl (meth)acrylate crosslinking agents, such as glycidyl methacrylate; and allylepoxy crosslinking agents, such as allyl glycidyl ether.

(4) Crosslinking by Exposure to Radiation:

Polymer Compound (1) is crosslinked by exposing Polymer Compound (1) to ultraviolet rays, electron beam, or γ rays; or the raw material constituents are exposed to ultraviolet rays, electron beam, or γ rays to form crosslinks simultaneously with the synthesis of Polymer Compound (2).

(5) Crosslinking by Heating:

Polymer compound (2) or Polymer Compound (1) is heated to 100° C. or more to thermally form crosslinks between molecules of Polymer Compound (2) or Polymer Compound (1). For example, crosslinks are formed between carbons or between functional groups by radicals generated by heating.

Among these crosslinking methods, preferred are (1) crosslinking with a copolymerizable crosslinking agent, (2) Crosslinking with a reactive crosslinking agent, and (4) crosslinking by exposure to radiation, from a comprehensive viewpoint, depending on the applications or form of the resulting product.

Among the above-listed copolymerizable crosslinking agents, preferred are polyvalent (meth)acrylamide crosslinking agents, allyl ether crosslinking agents, and polyvalent (meth)acrylic ester crosslinking agents, and more preferred are allyl ether crosslinking agents. Among the above-listed reactive crosslinking agents, preferred are polyvalent isocyanate crosslinking agents and polyvalent epoxy crosslinking agents, and more preferred are polyvalent isocyanate or epoxy crosslinking agents having at least three functional group in the molecule.

The degree of crosslinking is selected according to the intended use. If a copolymerizable crosslinking agent is used, its content is preferably 0.001% to 10% by weight, more preferably 0.01% to 5% by weight, relative to the total weight of the raw material constituent.

If a reactive crosslinking agent is used, its preferred content depends on the form of the crosslinked product (A), but is preferably 0.001% to 10% by weight. In particular, in order to prepare a below-described favorable gel containing the liquid fuel, the content is preferably 0.05% to 50% by weight relative to the total weight of the raw material constituents.

The raw material constituents, that is, the acidic group-containing constitutional unit (a) and/or the onium cation substitution product of the acidic group-containing constitutional unit (a), and the optionally used additional constitutional unit (b), can be polymerized by known processes. Exemplary processes include solution polymerization that is performed in a solvent capable of dissolving the monomers used and the resulting polymer, mass polymerization performed with no solvent, and emulsion polymerization. Preferably, solution polymerization is applied.

The solvent used for the solution polymerization is selected according to the solubility of the monomer and polymer used. For example, an organic solvent or water is used. Exemplary organic solvents include alcohols, such as methanol and ethanol; carbonates, such as ethylene carbonate, propylene carbonate, and dimethyl carbonate; lactones, such as γ-butyrolactone; lactams, such as ε-caprolactam; ketones, such as acetone and methyl ethyl ketone; carboxylate esters, such as ethyl acetate; ethers, such as tetrahydrofuran and dimethoxyethane; and aromatic hydrocarbons, such as toluene and xylene. These solvents may be used singly or in combination.

The polymerization concentration for the solution polymerization is selected according to the intended use without particular limitation, but is preferably 1% to 80% by weight, and more preferably 5% to 60% by weight.

Generally used Polymerization initiators may be used, such as azo initiators, peroxide initiators, and redox initiators. Exemplary azo initiators include azobisisobutyronitrile, azobiscyanovaleric acid, azobis(2,4-dimethylvaleronitrile), azobis(2-amidinopropane)dihydrochloride, and azobis{2-methyl-N-(2-hydroxyethyl)propioneamide}. Exemplary peroxide initiators include benzoyl peroxide, di-1-butyl peroxide, cumene hydroperoxide, succinic acid peroxide, di(2-ethoxyethyl)peroxydicarbonate, and hydrogen peroxide. Exemplary redox initiators include combinations of the above-listed peroxide initiators and reducing agents (ascorbic acid and persulfates).

Other polymerizations may be applied, including a technique of adding a photosensitizing initiator [benzophenone, etc.] and irradiating ultraviolet light, and a technique of irradiating γ-rays or electron beam for polymerization.

If the polymerization initiator is used, its content is preferably, but not particularly limited to, 0.0001% to 5% by weight relative to the total weight of the raw material constituents, and more preferably 0.001% to 2% by weight.

The polymerization temperature is set according to the intended molecular weight, decomposition temperature of the initiator, boiling point of the solvent used, and other factors, but is preferably −20 to 200° C., and more preferably 0 to 100° C.

The thus prepared crosslinked product (A) has an ability to absorb the liquid fuel, and absorbs the liquid fuel to provide a stable fuel composition.

The amount of the liquid fuel absorbed to the crosslinked product (A) depends on the type of fuel, composition of the crosslinked product (A), and gel strength, and other factors. The crosslinked product (A) is preferably designed, for example, so as to absorb methanol in a ratio of 10 to 1,000 g of methanol/1 g of the crosslinked product (A), and more preferably in a ratio of 50 to 900 g/g. If the absorption is performed in a ratio of 10 g/g or more, a sufficient amount of liquid fuel can be stored and superior storage efficiency can be ensured. An absorption ratio of 1,000 g/g or less does not cause the fuel composition storing the liquid fuel to have low gel strength.

If the crosslinked product (A) according to the fourth aspect is in a form of particles, the particles preferably has a volume average particle size of 0.1 to 5,000 μm, and more preferably 50 to 2,000 μm. In addition, it is preferable that particles of less than 0.1 μm account for 10% by weight or less of the total and particles of more than 5,000 μm account for 10% by weight or less of the total. More preferably, the particles of these sizes each account for 5% or less.

The particle size can be measured by the method described in Perry's Chemical Engineers' Handbook 6th edition (McGraw-Hill Book Company, 1984, p. 21), using a Ro-tap sieve shaker and JIS Z8801-2000 standard sieves (hereinafter particle sizes are measured by this method).

In order to prepare the crosslinked product (A) in a form of particles, any technique can be applied without particular limitation, as long as the crosslinked product (A) results in particles. For example, the following techniques may be applied.

(i) The crosslinked product (A) of Polymer Compound (1) is prepared by polymerization with the copolymerizable crosslinking agent optionally using a solvent, and the solvent is, if necessary, evaporated by drying or the like. The product is pulverized into particles by a known pulverization technique.

(ii) Polymer Compound (1) is prepared by polymerization optionally using a solvent, and the Polymer Compound (1) is crosslinked by use of the above-described reactive crosslinking agent or by exposure. Then, the solvent is, if necessary, evaporated by drying or the like. The product is pulverized into particles by a known pulverization technique.

(iii) The acidic group-containing constitutional unit (a) and optionally the additional constitutional unit (b) are copolymerized to form crosslinks in the presence of the copolymerizable crosslinking agent, optionally using a solvent. Then, the onium cation compound is added to substitute the onium cation for a predetermined amount of proton of the acidic group. Subsequently the solvent is, if necessary, evaporated by drying or the like. The product is pulverized into particles by a known pulverization technique.

(iv) The acidic group-containing constitutional unit (a) and optionally the additional constitutional unit (b) are copolymerized to form uncrosslinked polymer in the presence of the copolymerizable crosslinking agent, optionally using a solvent. Then the polymer is crosslinked simultaneously with substitution for the proton of the acidic group by use of the onium cation compound and a reactive crosslinking agent or by exposure to radiation. Subsequently the solvent is, if necessary, evaporated by drying or the like. The product is pulverized into particles by a known pulverization technique.

Drying optionally performed in the course of the formation of the particles of the crosslinked product (A) can be performed by a known technique, such as through-flow drying (air circulation dryer, etc.), air permeation drying (band dryer, etc.), drying under reduced pressure (reduced-pressure dryer, etc.), or contact drying (drum dryer, etc.).

The drying temperature is not particularly limited unless the polymer is degraded or excessively crosslinked, but is preferably 0 to 200° C., and more preferably 50 to 150° C.

The particles of the crosslinked product (A) can be formed by a known technique, such as impact pulverization (pin mill-, cutter mill-, or ball mill-type pulverizer, high-speed pulverizer such as ACM pulverizer, etc.), air pulverization (jet pulverizer, etc.), and freezing pulverization.

The fuel composition containing the crosslinked product (A) and the fuel can be a variety of form depending on the intended use, without particular limitation. Preferably, the fuel composition is in a form of particles, sheet, or gel mixture.

The methods for preparing the preferred forms will now be described. The methods depend on the form of the fuel composition, and will be respectively described for the forms.

The fuel composition in a form of particles may be prepared by allowing particles of the crosslinked product (A) to absorb the liquid fuel, by pulverizing the fuel composition after the liquid fuel has been absorbed. The pulverization can be performed in the same manner as in the pulverization of the crosslinked product (A), and the volume average particle size and other properties are preferably the same as those of the crosslinked product (A).

The fuel composition in a form of sheet may be prepared by, for example, the following techniques (v) to (vii).

(V) Particles of the crosslinked product (A) are placed between nonwoven cloths or papers to form a sandwich sheet, and subsequently the sandwich sheet is allowed to absorb the liquid fuel.

(Vi) An uncrosslinked polymer compound (1) is applied onto and/or impregnated into a base made of at least one of nonwoven cloth, woven cloth, paper, or film, and then Polymer Compound (1) is crosslinked by at least one technique selected from among use of the crosslinking agent, exposure to radiation, and heating. After optionally evaporating the solvent and sheeting, the liquid fuel is absorbed to the sheet.

(vii) A mixture containing 20% to 100% by weight of acidic group-containing constitutional unit (a) in which the onium cation is substituted for 30% to 100% by mole of proton, 0 to 80% by weight of additional constitutional unit (b), and the crosslinking agent is impregnated into and/or applied onto a base made of at least one of nonwoven cloth, woven cloth, paper, and film. Then, the mixture is polymerized by at least one technique selected from among use of a polymerization initiator and/or crosslinking by exposure to radiation, and crosslinking by heating. After optionally evaporating the solvent and sheeting, the liquid fuel is absorbed to the sheet.

Preferably, (vi) or (vii) is applied from the viewpoint of ease of control of the sheet thickness and the speed of absorption to the sheet. The fuel composition sheet has a thickness of preferably 1 to 50,000 μm, more preferably 5 to 30,000, and particularly 10 to 10,000 μm. Thicknesses of 1 μm or more prevents the basis weight of the crosslinked product (A) from being excessively low, and thicknesses of 50,000 μm or less are not too large. The length and width of the sheet can be appropriately set according to the intended size without particular limitation, but preferably, the sheet has a thickness of 0.01 to 10,000 m and a width of 0.1 to 300 cm.

The basis weight of the crosslinked product (A) in the fuel composition sheet is not particularly limited, but preferably 10 to 3,000 $g/m^2$, more preferably 20 to 1,000 $g/m^2$, from the viewpoint of the ability to absorb or store the liquid fuel, and the prevention of large thickness.

The base optionally used in the fourth aspect for forming the sheet, such as nonwoven cloth, woven cloth, paper, or film, can be selected from known materials. Exemplary bases include nonwoven cloths or woven cloths with a basis weight of about 10 to 500 $g/m^2$ made of synthetic fiber and/or natural fiber, papers (high-quality paper, tissue paper, Japanese paper, etc.), synthetic resin films, and composites made of at least two of these materials.

Among these bases, preferred are nonwoven cloth and composites of a nonwoven cloth and a plastic or metal film, and particularly preferred are nonwoven cloths and composites of a nonwoven cloth and a plastic film.

The base generally has a thickness of, but not limited to, 1 to 50,000 μm, and preferably 10 to 20,000 μm. A thickness of less than 1 μm makes it difficult to impregnate or apply a predetermined amount of Polymer Compound (1), and a thickness of more than 50,000 μm is so large that the fuel composition containing the fuel cell fuel is increased in size and is accordingly not easy to use.

Polymer Compound (1) can be applied onto or impregnated into the base by a known technique, such as normal coating or padding. After coating or padding, the solvent optionally used for polymerization, dilution, viscosity adjustment, or the like may be evaporated by drying or the like, if necessary.

The amount of the fuel absorbed to the fuel composition sheet (fuel content) is not particular limited, as long as ensuring sufficient fuel supply. Preferably, the fuel is absorbed in a rate of 0.1 to 500 g per sheet of 1 $cm^2$, and more preferably in a rate of 400 $g/cm^2$. If the absorption is performed in a rate of 0.1 $g/cm^2$ or more, a sufficient amount of liquid fuel can be absorbed. An absorption rate of 500 $g/cm^2$ or less prevents the sheet containing absorbed liquid fuel from having an excessively large thickness.

The fuel composition according to the fourth aspect may be in a form of gel mixture containing the crosslinked product (A) and the liquid fuel. The ratio of crosslinked product (A)/fuel in the gel mixture fuel composition is preferably 0.1% to 99% by weight/1% to 99.9% by weight, more preferably 0.5% to 50% by weight/50% to 99.5% by weight, particularly 1% to 30% by weight/70% to 99% by weight, and most preferably 1% to 20% by weight/80% to 99% by weight. If the ratio of the crosslinked product (A) is 0.1% by weight or more, the gel strength of the resulting fuel-containing gel is not excessively reduced, and gelation of the entire fuel composition is ensured. In contrast, a ratio of 99% by weight or less is not excessively high and prevents the content of the required crosslinked product (A) from being excessively low, and accordingly can ensure sufficient fuel supply.

The gel mixture fuel composition can be prepared by, for example, (viii) adding a predetermined amount of fuel to the above-describe particles of the crosslinked product (A); or (ix) adding the fuel to the sheet containing the crosslinked product (A). The gel containing the fuel is preferably prepared by the following methods (X) and (xi) and the like.

(X) Polymer Compound (1) is dissolved in the liquid fuel and crosslinked by use of a crosslinking agent, exposure to radiation, or heating, and thus the gel mixture is prepared.

(xi) 20% to 100% by weight of acidic group-containing constitutional unit (a) in which the onium cation is substituted for 30% to 100% by mole of proton, and optionally 0 to 80% by weight of additional constitutional unit (b) are polymerized in the presence of the copolymerizable crosslinking agent to prepare the gel mixture.

The gel mixture fuel composition containing the crosslinked product (A) and the liquid fuel can be in any form. For example, it may be in a sheet or block form, or a spherical or columnar shape. Preferably, the gel mixture fuel composition is in a sheet or block form or a columnar shape.

The gel sheet, if it is used, preferably has a thickness of 1 to 50,000 μm, and more preferably 10 to 20,000 μm. The width and length of the gel sheet are appropriately set according to the intended use and place, or the application.

In order to prepare the gel mixture fuel composition in a desired form, any method can be applied without particular limitation. For example, gelation may be performed in a container or cell selected according to the intended shape, or a mixture of Polymer Compound (1) or the raw material constituents and the liquid fuel is deposited or applied onto a release paper, a film, a nonwoven cloth, or the like to form a gel sheet.

The fuel composition in this form may contain at least one selected from the group consisting of other gelling agents (fatty-acid soap, dibenzalsorbitol, hydroxypropyl cellulose, benzylidene sorbitol, carboxyvinyl polymer, polyethylene glycol, polyoxyalkylene, sorbitol, nitrocellulose, methylcellulose, ethylcellulose, acetylbutylcellulose, polyethylene, polypropylene, polystyrene, ABS resin, AB resin, acrylic resin, acetal resin, polycarbonate, nylon, phenol resin, phenoxy resin, urea resin, alkyd resin, polyester, epoxy resin, diallyl phthalate resin, polyallomer, etc.), absorbers (dextrin, dextran, silica gel, silica, alumina, molecular sieves, kaolin, diatomaceous earth, carbon black, activated carbon, etc.), thickeners, binders, and materials for chemically converting the fuel into an immobilized state, if necessary. These additives may be in a solid or a liquid form or in any other form without particular limitation, as long as they can function as they are. Also, these additives may be added in arbitrary stages in the course of the preparation of the fuel composition.

[3] Method for Releasing Fuel Cell Fuel from Fuel Composition

In the fourth aspect, in order to release the fuel cell fuel from the fuel composition: [1] containing the molecular compound with the fuel cell fuel; or [2] prepared by allowing a polymer to absorb the fuel cell fuel, the fuel composition is brought into contact with water to extract the fuel cell fuel of the fuel composition into the water.

In this instance, the water may be an aqueous solution of the fuel cell fuel. The contact of the fuel composition with water may be performed at room temperature without heating, or may be performed with heating to about 50 to 150° C.

How the fuel composition is brought into contact with water is not particularly limited. For example, a container having a water inlet and a water outlet through which water can flow in or out may be filled with the fuel composition and then water is delivered into the container. Alternatively, the fuel composition may be placed in a water bath to release the fuel.

The fuel released into water from the fuel composition is appropriately adjusted into a fuel aqueous solution with a concentration according to the intended use. For example, the fuel aqueous solution may be adjusted to a concentration of about 1% to 64% by weight and supplied to the fuel cell.

According to the fourth aspect, the fuel cell fuel can be easily released from the fuel composition containing the fuel cell fuel in an extremely simple manner without use of a heating apparatus or heating energy by, for example, delivering water into a container filled with the fuel composition.

Accordingly, the hard-to-handle fuel cell fuel can be safely and stably stored as a fuel composition containing fuel cell fuel, and the fuel cell fuel can be easily released from the fuel composition at low cost. The fourth aspect is extremely advantageous in industry.

Among fuel cell fuels, undiluted methanol is designated as a deleterious substance under the Poisonous and Deleterious Substances Control Law and classified in hazard category 4, and therefore should be handled with due care. In addition, high concentration methanol may cause corrosion or the like. Accordingly, methanol used as a fuel is generally in a form of aqueous solution of about 10% to 30% by weight. In the fourth aspect, the fuel in the fuel composition is released into water by bringing the fuel composition into contact with the water, and thus the fuel is supplied as a fuel cell aqueous solution with an appropriate concentration. The releasing method of the fourth aspect is also extremely advantageous in industry.

The fourth aspect is useful as a method for releasing a fuel from a fuel composition used for solid polymer electrolyte fuel cells, particularly for direct methanol fuel cells that are thought of for portable small-size fuel cells. However, the method can be applied for releasing fuels from fuel compositions containing a variety of fuel cell fuels without limiting to those applications.

The fourth aspect will be further described with reference to the Production Examples an Examples. However, the fourth aspect is not limited to the Examples unless it is beyond the scope.

Production Example 1

In 50 ml of methanol, 26.8 g (0.1 mol) of 1,1-bis(4-hydroxyphenyl)cyclohexane (hereinafter referred to as "BHC") was dissolved with heating and was recrystallized to prepare a solid methanol inclusion compound of BHC:methanol=1:1 (on a molar basis) with a methanol content of 11% by weight.

Production Example 2

In 100 mL of methanol, 41.4 g (0.1 mol) of 1,1,6,6-tetraphenylhexa-2,4-diyne-1,6-diol (hereinafter referred to as "TPHDD") was dissolved with heating and was recrystallized to prepare a solid methanol inclusion compound of TPHDD:methanol=1:2 (on a molar basis) with a methanol content of 13% by weight.

Production Example 3

In 100 mL of methanol, 39.8 g (0.1 mol) of 1,1,2,2-tetrakis(4-hydroxyphenyl)ethane (hereinafter referred to as "THPE") was dissolved with heating and was recrystallized to prepare a solid methanol inclusion compound of THPE:methanol=1:2 (on a molar basis) with a methanol content of 14% by weight.

Production Example 4

In a 2 L thermally insulated cell were placed 360 g (5 mol) of acrylic acid, 1.08 g of pentaerythritol triallyl ether, and 1140 g of water. The monomer solution was cooled to 0° C., and was purged with nitrogen to reduce dissolved oxygen. Then, 0.36 g of 2,2'-azobis(2-amidinopropane)hydrochloride, 3.1 g of 35% by weight hydrogen peroxide, and 0.38 g of L-ascorbic acid were added as polymerization initiators to initiate polymerization. After the polymerization, the resulting hydrated gel was cut into small pieces with a meat chopper, and then 1353 g (4 mol) of methanol solution of 60% 1,2,3,4-tetramethylimidazolinium methylcarbonate (molecular weight: 203) (produced by Sanyo Chemical Industries) was added to the gel. Consequently, it was observed that decarboxylation and demethanolization occurred. The gel to which the imidazolinium cation had been added was dried to evaporate the water used as the solvent and by-product methanol by allowing hot air of 100° C. to pass through the gel with a band dryer (air permeation dryer, produced by Inoue Kinzoku Kogyo). The dried product was pulverized with a cutter mill. Thus, particles of a crosslinked product with an average particle size of 400 μm were produced. To 100 g of methanol was absorbed 20 g of the particles to prepare a gel fuel composition.

Example 17

First, an electrolyte membrane-electrode assembly (MEA) was prepared in the following manner. A perfluorosulfonic acid ion-exchange membrane Nafion was used as the electrolyte membrane. Pt particles were used as the catalyst and supported by acetylene black to give electron conductivity. The amount of supported Pt was set at 50% by weight relative to acetylene black. The Pt-supporting catalyst and 5% by weight Nafion solution were mixed and sprayed onto the electrolyte membrane with a spray brush, thereby forming an electrode layer. After being dried at 90° C. for 1 hour in a dryer, the resulting membrane with the electrode layer was sandwiched between Teflon plates and pressed at 130° C., 20 MPa for 30 minutes with a hot press machine to bond the electrolyte membrane and the electrode.

Figure 7:
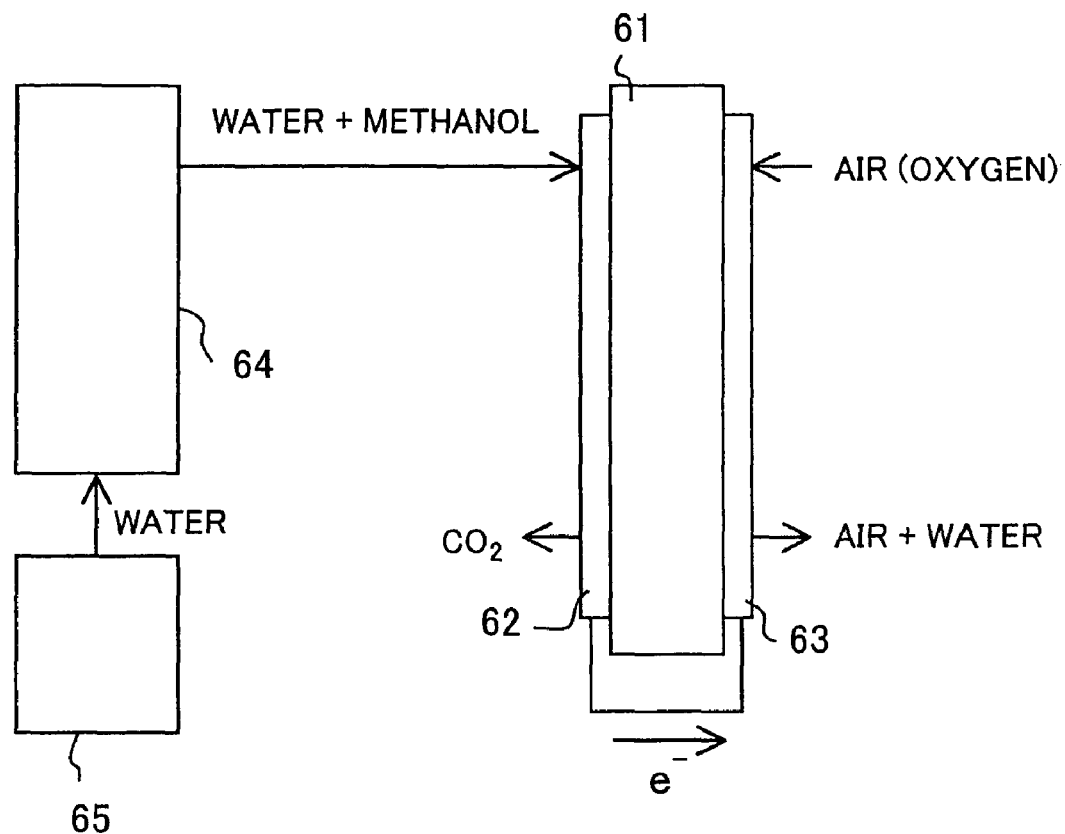
FIG. 7 is a schematic block diagram of a fuel cell system prepared in Example 17.

A direct methanol fuel cell system for supplying a methanol aqueous solution was prepared using the resulting electrolyte membrane-electrode assembly (MEA), as shown in FIG. 7. In FIG. 7, 61 denotes the electrolyte membrane; 62, an electrode (anode); 63, an electrode (cathode); 64, a fuel composition tank; and 65, a water tank.

The methanol inclusion compound prepared in Production Example 1 was placed in the fuel composition tank 64, and water was delivered to the fuel composition tank 64 from the water tank 65 to bring the methanol inclusion compound into contact with the water. Thus methanol was released to the water to prepare 20% by weight methanol aqueous solution. This methanol aqueous solution was supplied to the fuel absorber of the electrolyte membrane-electrode assembly. The methanol solution used in the anode 62, whose concentration was reduced, may be collected, treated by $CO_2$ removing means, and returned to the water tank 65. Water product in the cathode 63 may be collected and delivered to the water tank 65.

As a result, the methanol aqueous solution was stably supplied to the fuel cell, and thus electric power was generated by stable operation over a long time.

In the use of the methanol inclusion compounds prepared in Production Examples 2 and 3 as the fuel composition, and in the use of the gel fuel composition prepared in Production Example 4, the same resulted.

The results above show that by bring the fuel composition into contact with water, the fuel cell fuel can be easily released into the water and stably supplied to the fuel cell.

The invention claimed is:

1. A fuel cell fuel comprising an organic fuel used for a fuel cell, the organic fuel being in a form of a solid molecular compound;
    wherein the solid molecular compound is an inclusion compound formed of the organic fuel and a host compound;
    wherein the host compound comprises at least one compound selected from the group consisting of monomolecular, multimolecular, and polymeric host compounds; and
    wherein the host compound comprises at least one compound selected from the group consisting of phenolic host compounds, amidic host compounds, and imidazolic host compounds.

2. The fuel cell fuel according to claim 1, wherein the fuel cell is a solid polymer electrolyte fuel cell.

3. The fuel cell fuel according to claim 2, wherein the fuel cell is a direct methanol fuel cell.

4. The fuel cell fuel according to claim 1, wherein the fuel cell is a portable small-size fuel cell.

5. The fuel cell fuel according to claim 1, wherein the organic fuel comprises at least one selected from the group consisting of alcohols, ethers, hydrocarbons, and acetals.

6. The fuel cell fuel according to claim 5, wherein the organic fuel comprises at least one selected from the group consisting of methanol, ethanol, n-propanol, isopropanol, ethylene glycol, dimethyl ether, methyl ethyl ether, diethyl ether, propane, butane, dimethoxy methane, and trimethoxymethane.

7. The fuel cell fuel according to claim 1, wherein the host compound is supported in a porous material.

8. The fuel cell fuel according to claim 1, wherein the host compound comprises at least one compound selected from the group consisting of 1,1-bis(4-hydroxyphenyl)cyclohexane, 1,1,2,2-tetrakis(4-hydroxyphenyl)ethane, 1,1,2,2-tetrakis(4-hydroxyphenyl)ethylene, bis(dicyclohexylamide) diphenate, bisdicyclohexylamide fumarate, and 2-(m-cyanophenyl)phenanthro[9,10-d]imidazole.

9. A method for supplying a fuel cell fuel, comprising the step of releasing the organic fuel from the fuel cell fuel as set forth in claim 1 and subsequently supplying the organic fuel to a fuel electrode of a fuel cell.

10. The method for supplying a fuel cell fuel according to claim 9, wherein the organic fuel is released by heating the fuel cell fuel.

11. The method for supplying a fuel cell fuel according to claim 9, wherein the organic fuel is released to water by bringing the fuel cell fuel into contact with the water.

12. A method for detecting the content of a fuel cell fuel material in a fuel cell fuel composition containing a molecular compound formed of the fuel material and a counterpart compound, the method comprising:
    the step of comparing the indexical property of the molecular compound and/or the counterpart compound with the indexical property of the fuel composition.

13. The method for detecting the fuel material content in the fuel cell fuel composition according to claim 12, wherein the indexical property is color.

14. The method for detecting the fuel material content in the fuel cell fuel composition according to claim 12, wherein the counterpart compound has a chromogenic functional group.

15. The method for detecting the fuel material content in the fuel cell fuel composition according to claim 12, wherein the fuel cell fuel composition is used for a solid polymer electrolyte fuel cell.

16. The method for detecting the fuel material content in the fuel cell fuel composition according to claim 15, wherein the fuel cell is a direct methanol fuel cell.

17. The method for detecting the fuel material content in the fuel cell fuel composition according to claim 12, wherein the fuel cell fuel composition is used for a portable small-size fuel cell.

18. The method for detecting the fuel material content in the fuel cell fuel composition according to claim 12, wherein the fuel material is at least one selected from the group consisting of hydrogen, alcohols, ethers, hydrocarbons, and acetals.

19. The method for detecting the fuel material content in the fuel cell fuel composition according to claim 18, wherein the fuel material is at least one selected from the group consisting of hydrogen, methanol, ethanol, n-propanol, isopropanol, ethylene glycol, dimethyl ether, methyl ethyl ether, diethyl ether, propane, butane, dimethoxymethane, and trimethoxymethane.

20. The method for detecting the fuel material content in the fuel cell fuel composition according to claim 18, wherein the molecular compound is an inclusion compound formed of the fuel material and a host compound.

21. The method for detecting the fuel material content in the fuel cell fuel composition according to claim 20, wherein the host compound is supported in a porous material.

22. The method for detecting the fuel material content in the fuel cell fuel composition according to claim 20, wherein the host compound is at least one compound selected from the group consisting of organic compounds, inorganic compounds, and organic-inorganic complex compounds.

23. The method for detecting the fuel material content in the fuel cell fuel composition according to claim 20, wherein the host compound is at least one compound selected from the group consisting of monomolecular, multimolecular, and polymeric host compounds.

24. The method for detecting the fuel material content in the fuel cell fuel composition according to claim 20, wherein the host compound is prepared by introducing a chromogenic functional group into an imidazole, and expressed by general formula (1):

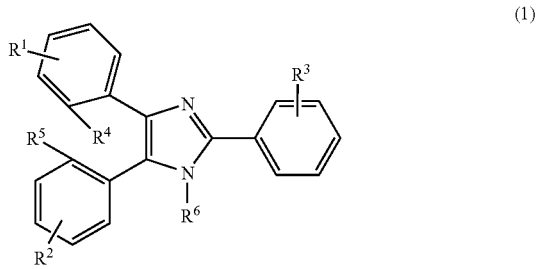

wherein the formula (1), R1, and R2 may be the same or different, and each represent hydrogen, methoxy, amino, dimethylamino, nitro, or halogen; R3 represents nitro, cyano, ethoxycarbonyl, acetyl, or formyl; R4 and R5 each represent hydrogen, or are bound to each other to form a condensed ring; R6 represents hydrogen, an alkyl group having a carbon number of 1 to 4, phenyl, or a phenyl group substituted with at least one selected from the group consisting of methoxy, amino, dimethylamino, nitro, and halogen.

25. The method for detecting the fuel material content in the fuel cell fuel composition according to claim 24, wherein the imidazolic host compound expressed by general formula (1) is at least one selected from the group consisting of
4,5-bis(4-methoxyphenyl)-2-(2-nitrophenyl)imidazole,
4,5-bis(4-methoxyphenyl)-2-(3-nitrophenyl)imidazole,
4,5-bis(4-methoxyphenyl)-2-(4-nitrophenyl)imidazole,
4,5-bis(4-aminophenyl)-2-(2-nitrophenyl)imidazole,
4,5-bis(4-aminophenyl)-2-(3-nitrophenyl)imidazole,
4,5-bis(4-methoxyphenyl)-2-(4-nitrophenyl)imidazole,
4,5-bis(4-methoxyphenyl)-2-(2-nitrophenyl)-1-methylimidazole,
4,5-bis(4-methoxyphenyl)-2-(3-nitrophenyl)-1-methylimidazole,
4,5-bis(4-methoxyphenyl)-2-(4-nitrophenyl)-1-methylimidazole,
2-(2-nitrophenyl)phenanthro[9,10-d]imidazole,
2-(3-nitrophenyl)phenanthro[9,10-d]imidazole,
2-(4-nitrophenyl)phenanthro[9,10-d]imidazole,
1-methyl-2-(2-nitrophenyl)phenanthro[9,10-d]imidazole,
1-methyl-2-(3-nitrophenyl)phenanthro[9,10-d]imidazole,
1-methyl-2-(4-nitrophenyl)phenanthro[9,10-d]imidazole,
1-phenyl-2-(2-nitrophenyl)phenanthro[9,10-d]imidazole,
1-phenyl-2-(4-nitrophenyl)phenanthro[9,10-d]imidazole,
1-(4-nitrophenyl)-2-(4-nitrophenyl)phenanthro[9,10-d]imidazole, and
1-(4-methoxyphenyl)-2-(4-nitrophenyl)phenanthro[9,10-d]imidazole.

26. A solid-electrolyte fuel cell fuel comprising a liquid organic fuel and a compound forming a complex or molecular compound with the liquid organic;
wherein the compound forming the complex or molecular compound with the liquid organic fuel is at least one compound selected from compounds other than sulfuric acid, sugars, alcohols, amines, and strong electrolytes; and
wherein the compound forming the complex or molecular compound with the liquid organic fuel is at least one compound selected from the group consisting of phenolic compounds, hydroquinones, and amides.

27. The solid-electrolyte fuel cell fuel according to claim 26, wherein the compound forming a complex or molecular compound with the liquid organic fuel is at least one selected from the group consisting of 1,1-bis(4-hydroxyphenyl)cyclohexane, 1,1,2,2-tetrakis (4-hydroxyphenyl)ethane, 1,1,2,2-tetrakis(4-hydroxyphenyl)ethylene, hydroquinone, and bis-dicyclohexylamide fumarate.

28. The solid-electrolyte fuel cell fuel according to claim 26, wherein the liquid organic fuel is at least one selected from the group consisting of alcohols, ethers, cycloparaffins, cycloparaffins with hydrophilic groups, and substitution products of cycloparaffins.

29. The solid-electrolyte fuel cell fuel according to claim 28, wherein the liquid organic fuel is at least one selected from the group consisting of methanol, ethanol, propanol, dimethyl ether, cyclohexane, cycloparaffins with a hydroxy, carboxyl, amino, or amido group, and monosubstituted and disubstituted cycloparaffins.

30. The solid-electrolyte fuel cell fuel according to claim 26, further comprising water and/or an alcohol as a solvent, wherein the liquid organic fuel content in the solid-electrolyte fuel cell fuel is 5% to 90% by weight.

31. The solid-electrolyte fuel cell fuel according to claim 26, wherein the compound forming a complex or molecular compound with the liquid organic fuel has a concentration of 0.001 to 1 mol/L in the solid-electrolyte fuel cell fuel.

32. The solid-electrolyte fuel cell fuel according to claim 26, wherein the solid-electrolyte fuel cell fuel has a pH of 4 to 8.

33. A method for using a solid-electrolyte fuel cell including a fuel electrode, an oxidizing electrode, and a solid electrolyte membrane held between the fuel electrode and the oxidizing electrode, the method comprising the step of supplying the solid-electrolyte fuel cell fuel as set forth in claim 26 to the fuel electrode.

34. A solid-electrolyte fuel cell comprising a fuel electrode, an oxidizing electrode, a solid electrolyte membrane held between the fuel electrode and the oxidizing electrode, and the solid-electrolyte fuel cell fuel as set forth in claim 26.

35. A solid-electrolyte fuel cell comprising:
a liquid organic fuel and a compound forming a complex or molecular compound with the liquid organic fuel;
a fuel electrode;
an oxidizing electrode;
a solid electrolyte membrane held between the fuel electrode and the oxidizing electrode;
fuel supply means for supplying the solid-electrolyte fuel cell fuel to the fuel electrode,
collecting means for collecting the fuel discharged from the fuel electrode;
concentration adjusting means for adjusting the concentrations of the liquid organic fuel and the compound forming a complex or molecular compound with the liquid organic fuel, in the fuel collected by the collecting means; and
delivering means for delivering to the fuel supply means the fuel whose concentration has been adjusted by the concentration adjusting means.

36. A method for releasing a fuel cell fuel from a fuel composition containing the fuel cell fuel, the method comprising the step of bringing the fuel composition into contact with water, thereby releasing the fuel to water;
- wherein the fuel cell fuel composition contains a molecular compound formed of the fuel cell fuel and a counterpart compound;
- wherein the molecular compound of the fuel cell fuel is an inclusion compound formed of the fuel cell fuel and a host compound;
- wherein the host compound comprises at least one compound selected from the group consisting of monomolecular, multimolecular, and polymeric host compounds; and
- wherein the host compound comprises at least one compound selected from the group consisting of monomolecular, multimolecular, and polymeric host compounds.

37. The method for releasing the fuel cell fuel from the fuel composition according to claim 36, wherein the fuel cell fuel is used for a solid polymer fuel cell.

38. The method for releasing the fuel cell fuel from the fuel composition according to claim 37, wherein the fuel cell is a direct methanol fuel cell.

39. The method for releasing the fuel cell fuel from the fuel composition according to claim 36, wherein the fuel cell is a portable small-size fuel cell.

40. The method for releasing the fuel cell fuel from the fuel composition according to claim 36, wherein the fuel cell fuel comprises at least one selected from the group consisting of hydrogen, alcohols, ethers, hydrocarbons, and acetals.

41. The method for releasing the fuel cell fuel from the fuel composition according to claim 40, wherein the fuel cell fuel comprises at least one selected from the group consisting of hydrogen, methanol, ethanol, n-propanol, isopropanol, ethylene glycol, dimethyl ether, methyl ethyl ether, diethyl ether, propane, butane, dimethoxymethane, and trimethoxymethane.

42. The method for releasing the fuel cell fuel from the fuel composition according to claim 36, wherein the host compound is supported in a porous material.

43. The method for releasing the fuel cell fuel from the fuel composition according to claim 36, wherein the host compound comprises at least one selected from the group consisting of 1,1-bis(4-hydroxyphenyl)cyclohexane, 1,1,2,2-tetrakis(4-hydroxyphenyl)ethane, 1,1,2,2-tetrakis(4-hydroxyphenyl)ethylene, bis(dicyclohexylamide) diphenate, bisdicyclohexylamide fumarate, and 2-(m-cyanophenyl)phenanthro[9,10-d]imidazole.

44. A method for releasing a fuel cell fuel from a fuel composition containing the fuel cell fuel, the method comprising the step of bringing the fuel composition into contact with water, thereby releasing the fuel into the water,
- wherein the fuel cell fuel composition contains the fuel cell fuel and a crosslinked product (A) of Polymer Compound (1), and
- wherein the polymer compound (1) is a polymer or a copolymer of a constitutional unit (hereinafter referred to as "acidic group-containing constitutional unit (a)") having a carboxyl group and/or a sulfonic group in the molecule thereof, and is prepared by substituting an onium cation for 30% to 100% by mole of proton of the carboxyl group and/or the sulfonic group of Polymer Compound (2) that contains 20% to 100% by weight of the acidic group-containing constitutional unit (a).

45. The method for releasing the fuel cell fuel from the fuel composition according to claim 44, wherein the onium cation is a quaternary ammonium cation.

46. The method for releasing the fuel cell fuel from the fuel composition according to claim 45, wherein the quaternary ammonium cation is at least one cation selected from the group consisting of aliphatic ammonium cations, imidazolinium cations, and imidazolium cations.

47. The method for releasing the fuel cell fuel from the fuel composition according to claim 44, wherein the Polymer Compound (2) contains 40% to 100% by weight of the acidic group-containing constitutional unit (a), and the Polymer Compound (1) is prepared by substituting an onium cation for 50% to 100% by mole of proton of the carboxyl group and/or the sulfonic group of the Polymer Compound (2).

\* \* \* \* \*